US008362948B2

(12) United States Patent
Kolinko et al.

(10) Patent No.: US 8,362,948 B2
(45) Date of Patent: Jan. 29, 2013

(54) LONG RANGE MILLIMETER WAVE SURFACE IMAGING RADAR SYSTEM

(75) Inventors: Vladimir Kolinko, San Diego, CA (US); Chris Sexton, San Diego, CA (US); Grant Bishop, Carlsbad, CA (US); John Lovberg, San Diego, CA (US)

(73) Assignee: Trex Enterprises Corp, San Diego, CA (US)

( * ) Notice: Subject to any disclaimer, the term of this patent is extended or adjusted under 35 U.S.C. 154(b) by 0 days.

(21) Appl. No.: 13/374,362

(22) Filed: Dec. 22, 2011

(65) Prior Publication Data

US 2012/0249363 A1    Oct. 4, 2012

Related U.S. Application Data

(63) Continuation-in-part of application No. 12/806,488, filed on Aug. 13, 2010.

(60) Provisional application No. 61/626,660, filed on Oct. 1, 2011.

(51) Int. Cl.
*G01S 13/89* (2006.01)

(52) U.S. Cl. ............. 342/179; 342/27; 342/58; 342/180

(58) Field of Classification Search .................... 342/27, 342/57–58, 74–75, 81, 90, 100, 103, 179–180
See application file for complete search history.

(56) References Cited

U.S. PATENT DOCUMENTS

| 5,592,170 | A * | 1/1997 | Price et al. ...................... 342/22 |
| 7,724,180 | B2 * | 5/2010 | Yonak et al. ..................... 342/70 |
| 7,782,251 | B2 * | 8/2010 | Bishop et al. ................. 342/179 |
| 2005/0134440 | A1 * | 6/2005 | Breed ............................ 340/435 |
| 2008/0272955 | A1 * | 11/2008 | Yonak et al. .................... 342/54 |
| 2009/0135051 | A1 * | 5/2009 | Bishop et al. ................. 342/175 |
| 2011/0199254 | A1 * | 8/2011 | Bishop et al. ................. 342/179 |

* cited by examiner

*Primary Examiner* — John B Sotomayor
(74) *Attorney, Agent, or Firm* — John R. Ross

(57) ABSTRACT

A long range millimeter wave imaging radar system. Preferred embodiments are positioned to detect foreign object debris objects on surface of the runway, taxiways and other areas of interest. The system includes electronics adapted to produce millimeter wave radiation scanned over a frequency range of a few gigahertz. The scanned millimeter wave radiation is broadcast through a frequency scanned antenna to produce a narrow scanned transmit beam in a first scanned direction (such as the vertical direction) defining a narrow, approximately one dimensional, electronically scanned field of view corresponding to the scanned millimeter wave frequencies. The antenna is mechanically pivoted or scanned in a second scanned direction perpendicular to the first scanned direction so as to define a two-dimensional field of view.

24 Claims, 15 Drawing Sheets

LONG RANGE MILLIMETER WAVE SURFACE IMAGING RADAR SYSTEM

CROSS REFERENCE TO RELATED APPLICATIONS

This application is a continuation-in-part of Ser. No. 12/806,488, filed Aug. 13, 2010, Mobile Millimeter Wave Imaging System and claims the benefit of Provisional Patent Application Ser. No. 61/626,660, filed Oct. 1, 2011

FIELD OF THE INVENTION

The present invention relates to radar systems and in particular to millimeter wave imaging radar systems.

BACKGROUND OF THE INVENTION

Imaging with Millimeter Waves

Passive and active imaging systems operating at millimeter wavelengths (1 cm to 1 mm; 30 GHz to 300 GHz) are well known. Short wave lengths at mm-wave frequencies allow narrow beams to be created with relative small antennas and to produce high resolution passive and active images. Objects in the image can be accurately located due to the narrow beams and, when the systems operate in the radar mode, a high sensitivity for reflected signals can be achieved. An important quality of millimeter wave systems is that they are relatively little attenuated by substantial distances of fog or smoke compared to visible light. Radiation at these millimeter wave wavelengths penetrates substantial distances of fog and smoke. The millimeter wave radiation also penetrates clothing and significant thickness of other materials such as dry wood and wallboard. These millimeter wave imaging systems have therefore been proposed for aircraft to improve visibility through fog and for security applications for detection of concealed weapons and the like.

Passive Millimeter Wave Imaging

Passive millimeter wave imaging systems are described in U.S. Pat. Nos. 5,121,124 and 5,365,237, which are assigned to Applicant's employer. The systems described in those patents utilize antennas in which the direction of collected millimeter wave radiation is a function of frequency. This type of antenna is referred to as a "frequency scanned" antenna. The collected millimeter wave light is analyzed in a spectrum analyzer to produce a one-dimensional image. In the systems described in the '124 patent the antenna signal is used to modulate an acousto-optic device (a Bragg cell) that in turn modulates a laser beam to produce a spectral image. In the systems described in the '237 patent an electro-optic module is modulated by the antenna signal and the electro-optic module in turn modulates the laser beam to impose the millimeter wave spectral information on a laser beam that then is separated into spectral components by an etalon to produce an image.

U.S. Pat. No. 4,654,666 describes an imaging system which includes a frequency scanning antenna and a spectrum analyzer for converting coded radiation distributions collected by the antenna into a time coded distribution so that a one-dimensional scene can be reproduced. Other frequency scanned passive millimeter wave imaging systems are described in U.S. Pat. Nos. 7,194,236 and 6,937,182. All of the above identified patents are hereby incorporated by reference.

Radar Systems

Radar systems operating at millimeter frequencies also are known. These systems typically modulate a millimeter wave signal with a two or more lower frequency signals (called frequency shift keying or FSK) or with a linearly changing (ramping up or ramping down in frequency) lower frequency signals (called linear frequency modulated LFM). And combinations of FSK and LFM have been proposed. These FSK and LFM systems have been proposed for autonomous motor vehicle control and motor vehicle collision avoidance. Some of the systems provide techniques for angular scanning of either the transmit beam or the receive beam or both.

Foreign Object Detection

Foreign object debris on the airport runway and other surfaces (often referred to as FOD) represents a significant hazard for safety of the air traffic. Objects that fall off the aircraft, equipment on the ground or misplaced by the ground services are responsible for large business losses by the commercial airlines, airports and the military and, in extreme cases, can result in a loss of human life. FOD costs the aerospace industry $4 billion per year and causes expensive, significant damage every year to aircraft and parts and may cause death and injury to workers, pilots and passengers.

Attempts to introduce radar systems at the airports for FOD detection are also known. A high costs, complexity of operation, heavy infrastructure and experimental nature of such systems have been limiting their acceptance by the air transportation industry. A millimeter wave radar system designed and manufactured by a UK based company QinetiQ marketed under the name Tarsier is an example of an advanced mm-wave FOD detection system. A Tarsier system is presently in operation at Vancouver International Airport in Canada. The Tarsier radar was designed as a stationary, long range (up to 2 kilometers), frequency modulated radar to detect FOD along the entire length of the airport surfaces. This system is described in U.S. Pat. No. 7,592,943 which is incorporated herein by reference. The system utilizes frequency modulated continuous wave radar having improved frequency linearity of a voltage controlled oscillator (VCO) frequency sweep. It utilizes a frequency discriminator system to correct for non-linearity of the VCO. The discriminator signal is then used to adjust the signal sampling rate using an analog to digital converter. Long range of operation of the Tarsier system requires high precision mechanical and electronic components as well as high transmit power. These requirements result in a high cost for the system. In order to be able to detect FOD at long ranges the radar was designed to have very high sensitivity which reportedly caused significant amount of false alarms from signal clutter at shorter ranges.

According to the National Aerospace Standard 412 maintained by the National Association of FOD Prevention Inc., FOD is generally defined as a substance, debris or article alien to a vehicle or system which would potentially cause damage to the vehicle or system. Foreign object damage is any damage attributed to a foreign object that can be expressed in physical or economic terms that may or may not degrade the product's required safety and/or performance characteristics. Typically, FOD is an aviation term used to describe debris on or around an aircraft or damage done to an aircraft. Optical FOD detection systems operating with visible light are described in the Patents Nos. WO/2004/038675 and US20020080046 which are also incorporated herein by reference. Stationary millimeter wave radar systems, such as the Tarsier, may prove effective on sections of the airfield that have clear straight line of sight What is needed is a long range millimeter wave imaging system.

SUMMARY OF THE INVENTION

The present invention describes a long range millimeter wave imaging radar system. The radar is designed to operate as a stationary system to continuously or periodically monitor a particular surface region of the airport. Preferred embodiments are positioned to detect foreign object debris objects on surface of the runway, taxiways and other areas of interest. The system includes electronics adapted to produce millimeter wave radiation scanned over a frequency range of a few gigahertz. The scanned millimeter wave radiation is broadcast through a frequency scanned antenna to produce a narrow scanned transmit beam in a first scanned direction (such as the vertical direction) defining a narrow, approximately one dimensional, electronically scanned field of view corresponding to the scanned millimeter wave frequencies. The antenna is mechanically pivoted or scanned in a second scanned direction perpendicular to the first scanned direction (such as the horizontal or the azimuthal direction) so as to define a two-dimensional field of view. Reflected millimeter wave radiation is collected by the same frequency scanned antenna, which allows the receive beam to be perfectly aligned and co-directed with the transmit beam in the same field of view. The antenna design ensures very low signal coupling from the transmit circuits to the receive circuits. A circuit dedicated to cancelling signal leakage from transmitter into the receiver can be used to further increase isolation between Rx and Tx channels such that the transmit signal leakage does not interfere with receive signals from the FOD targets. Computer processor equipment compares the intensity of the receive millimeter radar signals for a pre-determined set of ranges and known directions of the transmit and receive beams as a function of time to produce a radar image of at least a desired portion of the field of view.

In a preferred embodiment the radar system is mounted on a stationary platform in a location assigned by the airport authorities. Multiple FOD finder systems in multiple locations can be deployed to meet the airport FOD surveillance needs. The radar system is capable of operating in the millimeter wave frequency range between 78 to 81 GHz. The frequency scanned antenna includes a 24-inches long slotted waveguide frequency scanned antenna and an elliptical cylindrical reflector adapted to produce a beam narrow in the vertical direction and frequency scanned in the vertical direction over a scanning range in elevation of approximately 4 degrees. The slotted frequency scanned antenna is located at the near focus of an elliptical cylinder reflector. The other focus of the elliptical reflector is at about 300 feet from the near focus. The antenna defines beams about half of a meter wide in the azimuth direction out to about 300 feet and diverging at about 0.35 degrees further out in both azimuth direction and in the vertical direction. The antenna system is pivoted on rotary platform to define a radar field of view (FOV) of about 4 degrees in the vertical direction and up to 360 degrees in the azimuthal direction. The antenna is generally directed horizontally or slightly at a downward angle from a raised platform to produce a field of view on the airport surface from about 20 meters to 500 meters in any direction from its location.

In the preferred embodiment the millimeter wave scanning frequencies are produced from a fixed 12.25 GHz signal generated by a phase locked oscillator and a voltage controlled oscillator. The fixed signal is converted to 36.75 GHz with a frequency tripler which is then doubled to 73.5 GHz with a harmonic mixer. A frequency scanned signal within 4.5 GHz to 7.5 GHz range from a voltage controlled oscillator is mixed in a harmonic mixer with the 73.5 GHz signal to provide a scanned millimeter wave signal between 78 GHz and 81 GHz. The millimeter wave signal is then fed to the transmit antenna to produce the frequency scanned transmit beam. The receive beam similar to that of the transmit beam is co-aligned with the transmit beam at any given time to maximize the return signals reflected by the objects. The received signal is down converted to low frequencies using local oscillators common with transmit and receive circuits, digitized and has its frequency spectrum generated using a digital Fast Fourier Transform (FFT) processor. The transmitter and receiver beams are electronically scanned in the vertical directions through approximately 4 degrees wide FOV. The beams are mechanically scanned in the azimuthal direction. A computer creates two-dimensional images (elevation angle and range) based on the vertical scanning direction of the beams and the transmit-return time difference and combines them with azmuthal angle based on horizontal scans to produce three-dimensional images. In the preferred embodiment of the FOD finder the distance to the FOD is determined based on the radar signal and azimuthal position is determined based on the horizontal scan information recorded by the system's computer processor. Substantially flat airport surfaces reflect radar energy mostly in the forward direction and produce very little return signals to the receive antenna. However, FOD objects on surface produce a large back-scattered return signal as the radar beam sweeps across them. Distance to the targets is determined based on a difference in frequency of the transmit signal and the receive signal delayed by a roundtrip time of the millimeter waves reflected from the FOD targets. The location of FOD on a runway is recorded and displayed on a monitor to represent a map of the FOD locations on the runway. The FOD radar system utilizes triangular frequency scan waveforms, which allows the system to discriminate between stationary and moving objects (such as airplanes, airport vehicles, personnel, widelife etc.) based on the measured Doppler frequency shift of the receive signals.

This preferred embodiment includes an integrated hardware/software system with external and internal visible and/or infrared light image recording in addition to the radar imaging equipment. The system also includes wireless (or other) communication and data reporting equipment to interact with airport personnel.

In the preferred embodiment the overall system is mounted on a stationary platform and optionally includes a GPS position tracking system, automatically controlled video camera for visual object identification and a computerized object logging and labeling system. In the second preferred embodiment the systems is mounted on a platform slowly moving alongside the runway using a tracks or other means. A mobile platform option may help reduce the overall number of the FOD radar systems required to cover the airport surfaces.

In preferred embodiments microcomputer or programmable gate array circuits and a digital-to-analog converter board are programmed to send out a drive voltage to the voltage controlled oscillator creating a fully programmable linear frequency ramp which drives the transmitter frequency. In other embodiments an analog ramp generator is programmed for slope, second and higher derivatives to create a desired voltage ramp signal. These components allow Applicants to adjust the sweep rate, range and accuracy of the frequency sweep. The linear frequency ramp defines the range and resolution for the radar system and also sweeps the antenna beam in elevation. Having this unique vertical angle steering capability allows the radar beam to be selectively pointed in elevation to track uneven airport surfaces during beam sweeps in the horizontal direction.

DETAILED DESCRIPTION OF PREFERRED EMBODIMENTS

First Preferred Embodiment

A preferred embodiment of the present invention is described in FIGS. 1 through 16. This embodiment is a three dimensional W-band Frequency Modulated Continuous Wave (FMCW) active imaging radar system. The system is capable of accurately determining the bearing and range to foreign objects on the airport surfaces and displaying this information to system operators. The system has up to 500 meters operation range and can be fixed at a certain location or slowly moved along a designated track.

The radar of the system consists of a millimeter wave transmitter, receiver, a common transmit-receive reflector antenna, digitizer of the receiver signal and FFT processor. The antenna forms narrow beams which are 0.35 degree wide in both the vertical and horizontal directions. The system employs a linear frequency modulated triangular chirp radio frequency waveform sweeping through 3 GHz wide frequency range between 78 GHz and 81 GHz in 10 milliseconds. The azimuthal resolution is about three meters at 500 meters range and the range resolution is about 60 cm.

Capabilities

The system provides the following capabilities:
1. Operational range: 20 m to 500 meters.
2. Hazard detection range: minimum 500 meters for a 1"×1" metal cylinder target.
3. Field of view: 360 degree horizontally (in azimuth) and 4 degree vertically (in elevation). The longitudinal field of view is from about 20 meters to 500 meters in front of antenna.
4. Range resolution: 60 cm.
5. Transmitter frequency sweep: linear triangular between 78 and 81 GHz;
6. Transmitter power: 200 milliwatt.
7. Antenna polarization: vertical.
8. Maximum number of independent (resolved) pixels: horizontal-1030 pixels for 360 degrees scan in azimuth, vertical-12 pixels.
9. One full 360 deg image acquisition time (horizontal scan): Minimum (without data averaging)-20 seconds, Maximum-20×N seconds, where N-number of averaged data per azimuth angle.

Imaging Radar System

Frequency Scanned Radar

Figure 1:
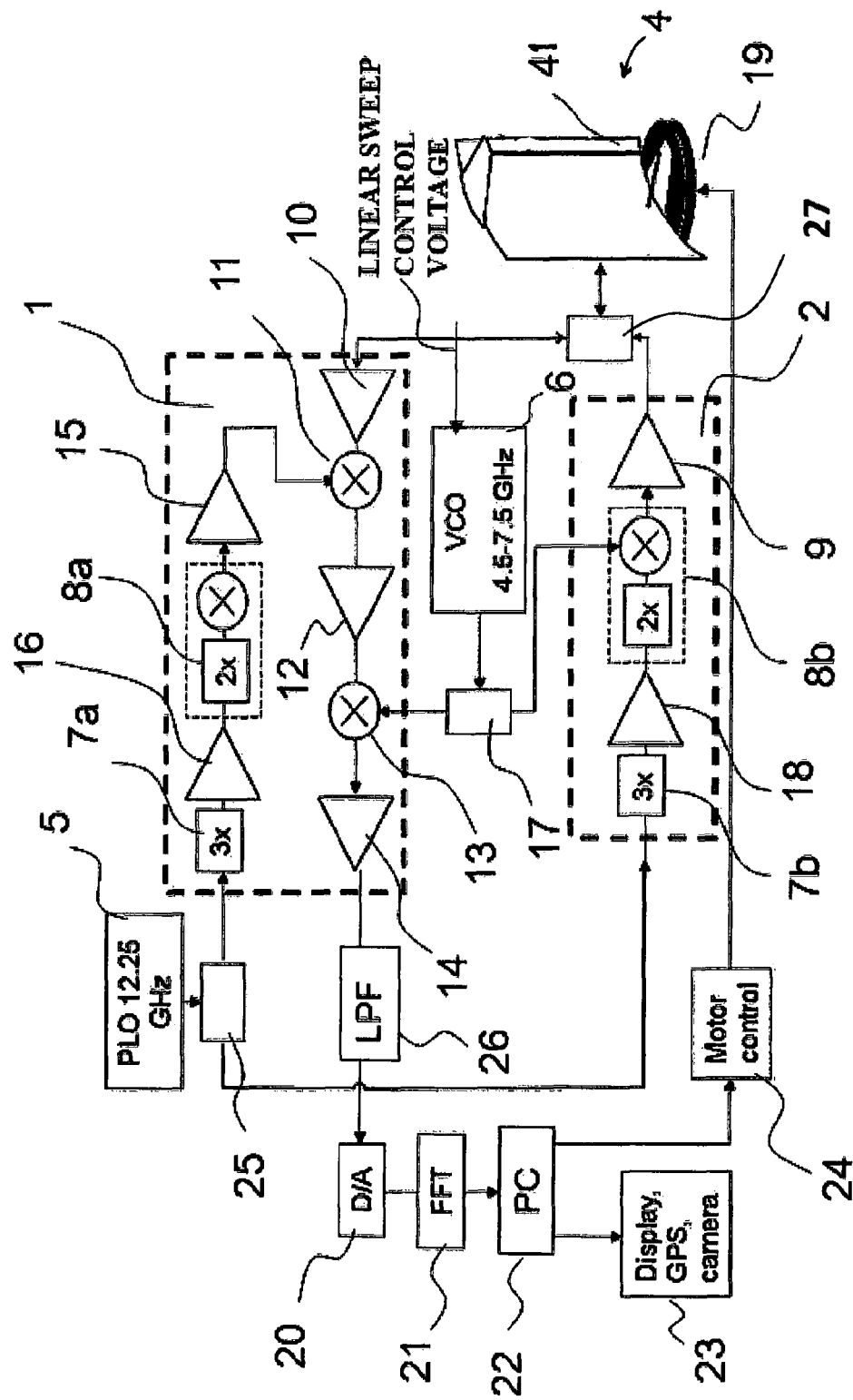
FIG. 1 is a block diagram of the foreign object detection radar including transmitter, receiver, antenna and signal processing components.
Figure 2A:
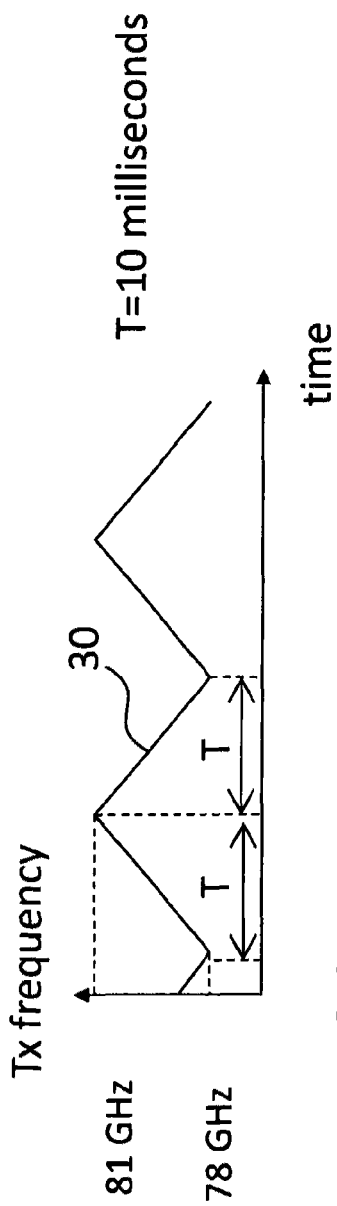
FIG. 2A shows triangular frequency sweep waveform of the radar.

A block diagram of an imaging radar system of a preferred embodiment of the present invention is shown in FIG. 1. In preferred embodiments a transmitter module 2 generates a continuous wave millimeter wave signal that is linearly swept back and forth through a 3 GHz wide frequency range between 78 and 81 GHz in 10 milliseconds using an alternating up-down see-saw frequency sweep pattern 30 as shown in FIG. 2A.

Figure 3:
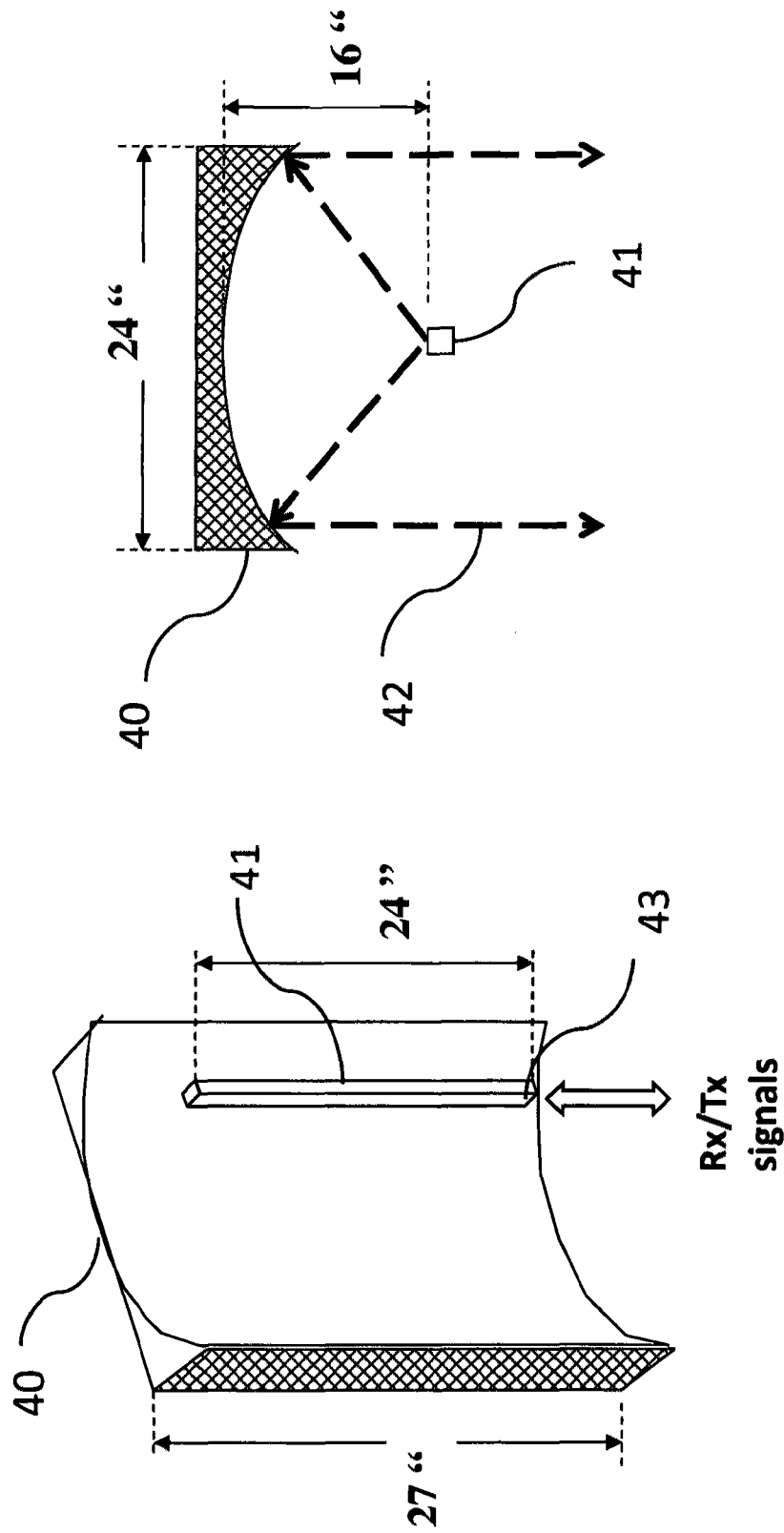
FIG. 3 shows configuration of the common transmit and receive antenna.
Figure 4:
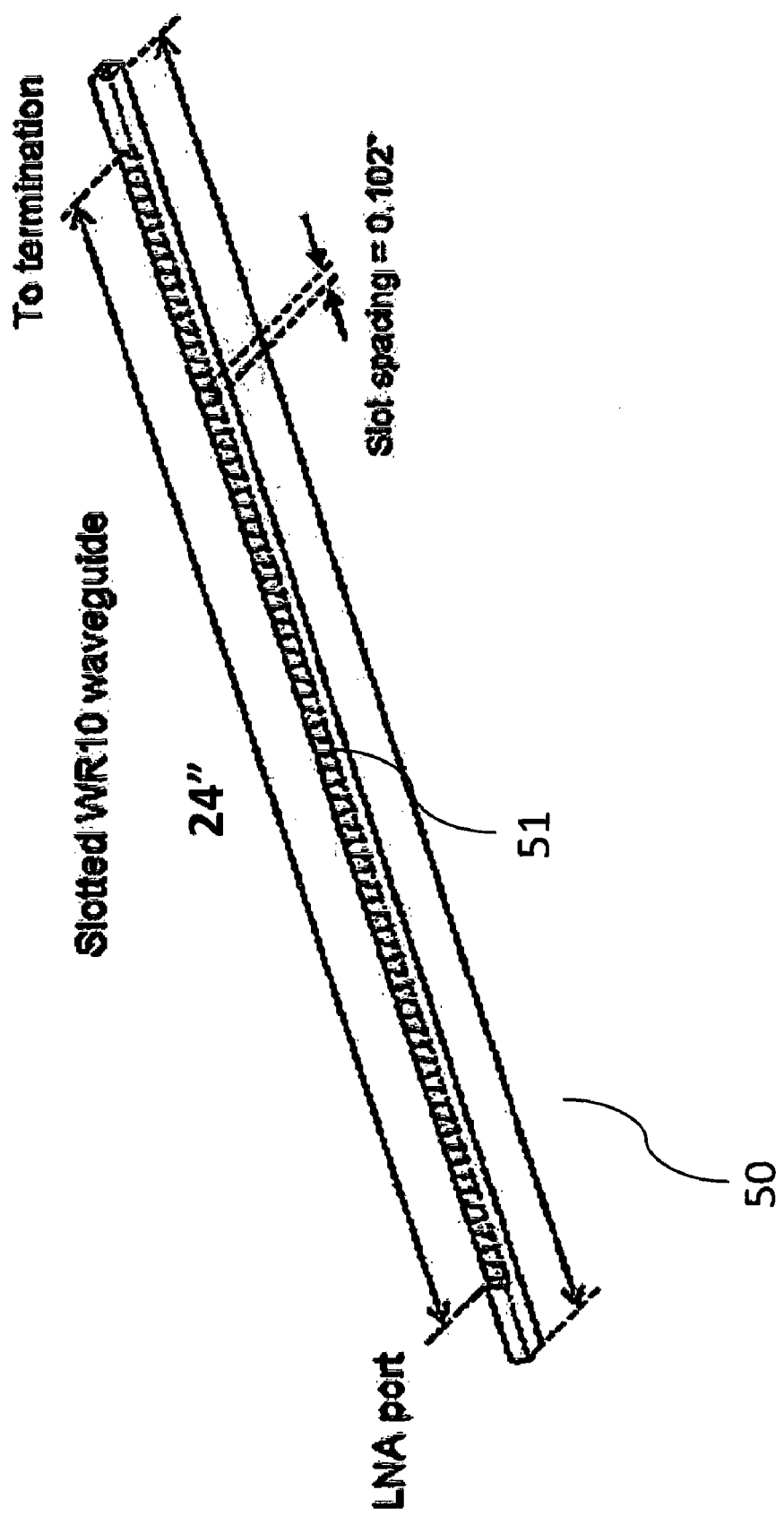
FIG. 4 shows slotted waveguide antenna.
Figure 5:
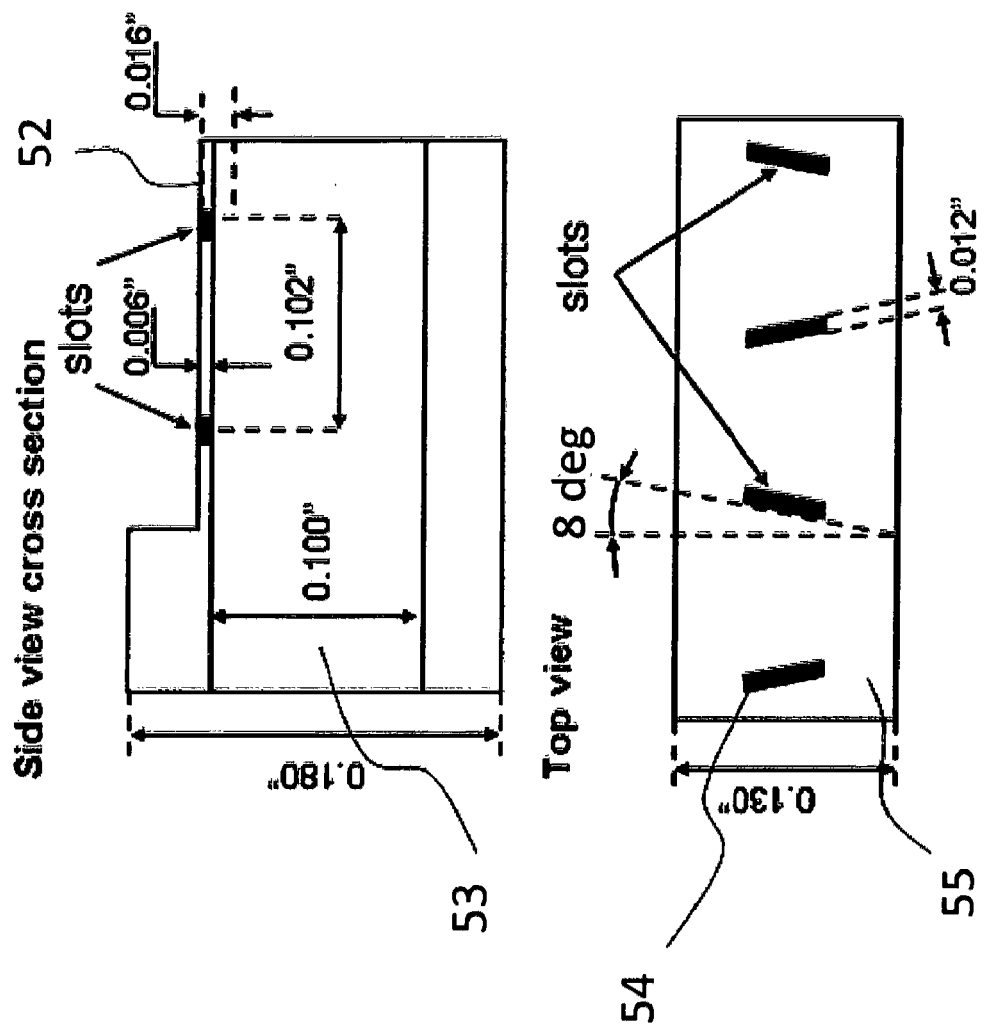
FIG. 5 shows design details of the frequency scanned slotted waveguide antenna.

A common transmit and receive antenna unit 4 (FIG. 1) utilizes slotted waveguide antenna element 41 positioned in the near focus of the antenna reflector 40 as shown in FIG. 3. The reflector is two feet wide and 27 inches high and has a shape of a vertically oriented elliptical cylinder. The slotted wave guide is located in the near focus of the elliptical surface at distance of 16 inches from the center of the reflector. The second focus of the reflector is located 300 feet out from the center. Transmit-receive slotted antenna is made from standard WR-10 copper wave guide with slots 54 cut into their narrow wall 55 as shown in FIGS. 4 and 5. The slotted section of the antenna is 24 inches long as shown in FIG. 4 *and* it is 0.13 inch wide. Slots are spaced 0.102 of an inch apart and their angle alternates +/−8 degrees as shown in FIG. 5. A portion of the narrow wall 52 of the wave guide is thinned to 0.006 of an inch before slots are cut 0.015 inch deep into the wave guide relative to its outer surface to produce the 54 slots through the narrow wall of the wave guide. The length of the slotted wave guide antenna determines the angular resolution (half power beam width) of 0.35 degree of the radar in the vertical direction. Horizontal angular resolution (half power beam width) of 0.35 degree is determined by the 24 inches wide aperture of the reflector 40 (FIG. 3) illuminated by the slotted wave guide. In the preferred embodiment the slotted waveguide frequency scanned antenna allows high angular resolution of the beams to be combined with a sufficiently wide vertical FOV of the radar. The use of the cylindrical elliptical reflector optimizes side-lobe level of the beam at various ranges. Beam side lobes are also reduced by providing maximum mm-wave power near center of the reflector and gradually reducing illumination toward its edges. This is accomplished by placing the slotted waveguide antenna in front of the reflector at a distance such that the beam from the waveguide provides approximately 10 dB less illumination intensity at the edges of the reflector as compared to the illumination intensity at the center of the reflector. A beam 42 (FIG. 3) radiated from the slotted waveguide and striking near edge of the reflector carries approximately −10 dB less power than the beam striking near center of the reflector. In this preferred embodiment electronics in the radar unit directs the antenna field of view to a range between 20 meters to 500 meters. The actual range span can be limited by the flatness of the runway, the height of the antenna platform above the ground or other factors.

Figure 6:
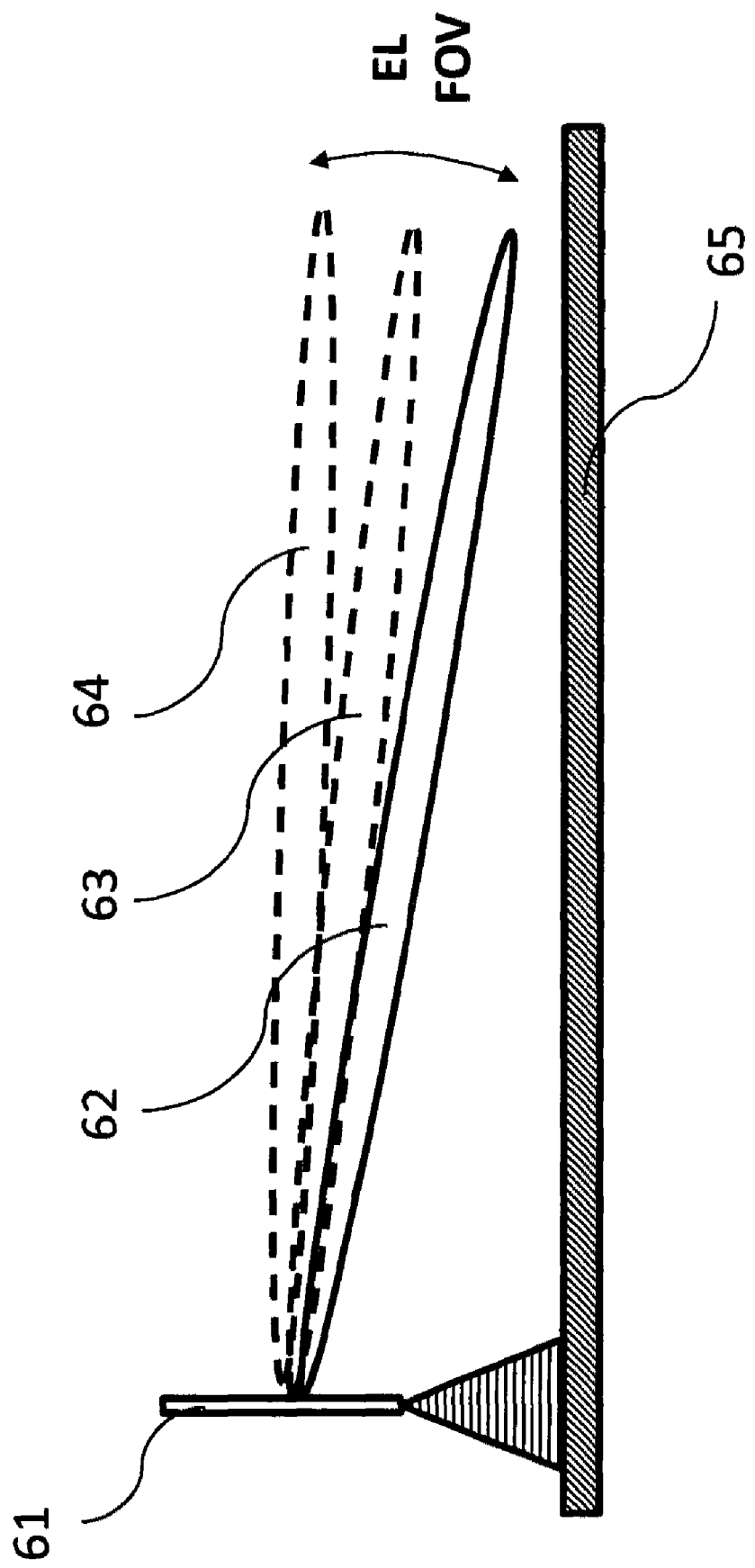
FIG. 6 illustrates the concept of the frequency scanned beam of the proposed radar system.
Figure 7:
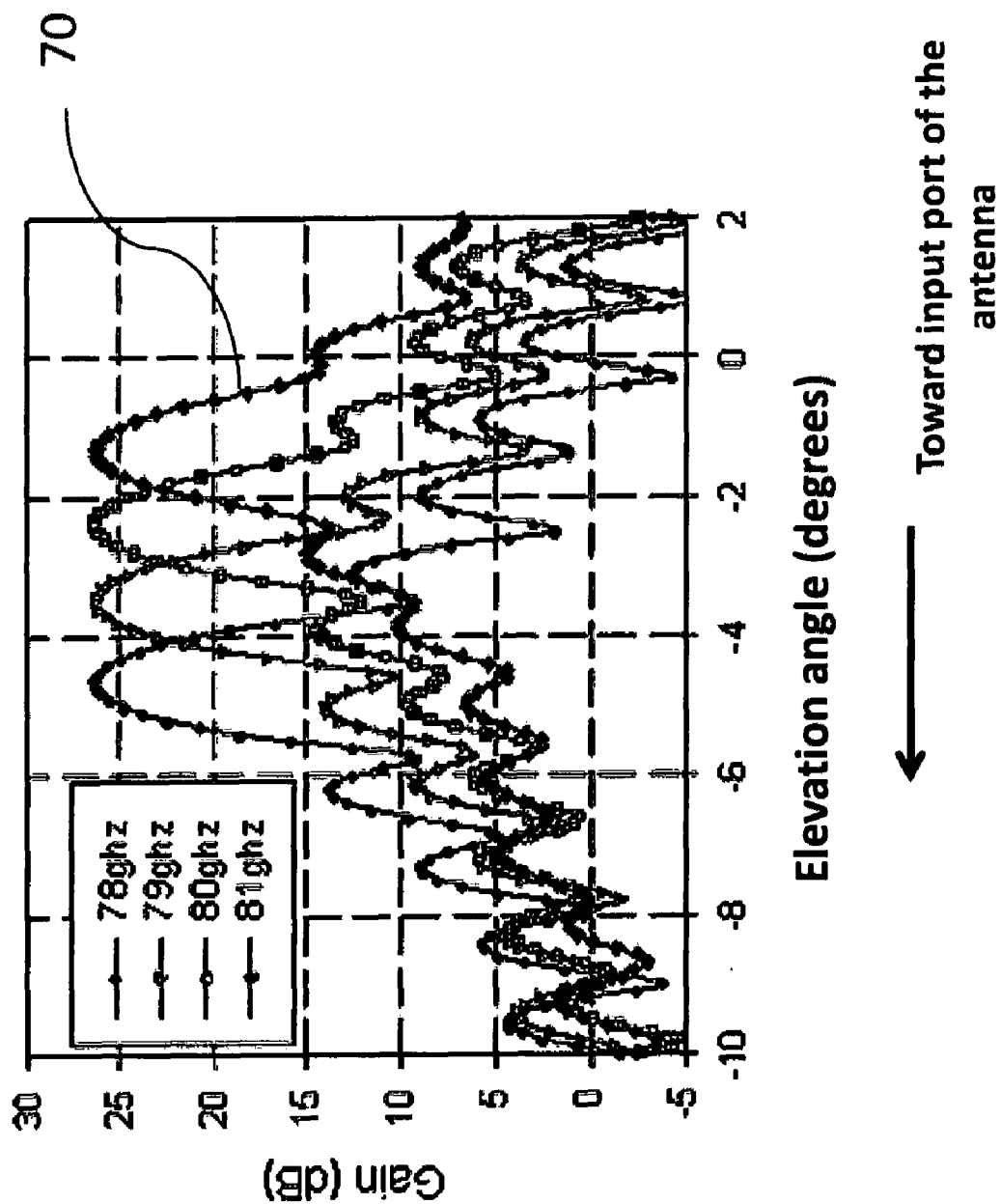
FIG. 7 shows plots of the slotted antenna beam patterns in the 78-81 GHz frequency range.
Figure 8:
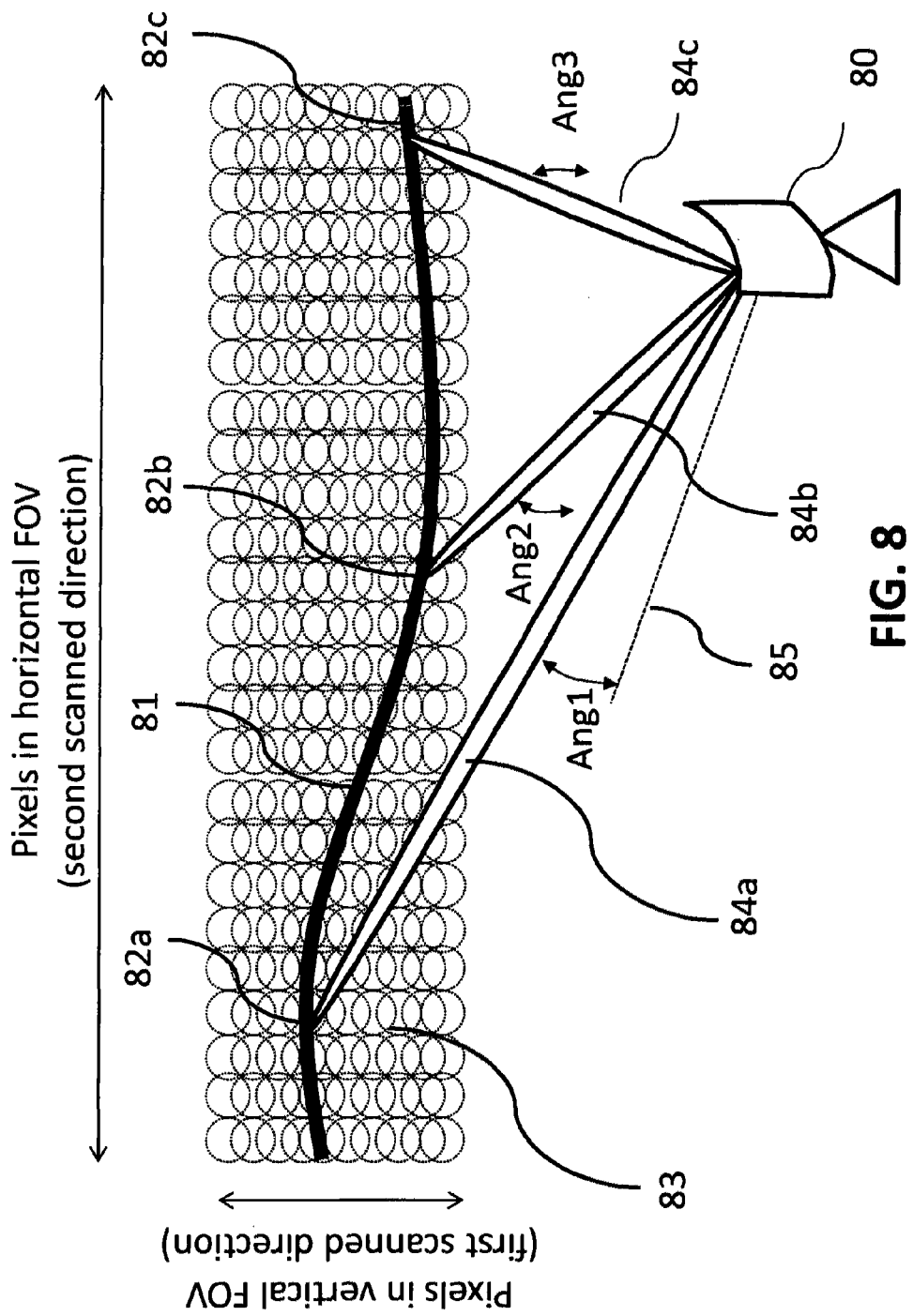
FIG. 8 illustrates the concept of tracking curved runway surface using frequency scanned property of the antenna.

As the millimeter wave signal frequency varies between 78 and 81 GHz the beam 62 formed by the slotted antenna 61 (FIG. 6) changes its angular position through as shown at 62 to 64 in FIG. 6 with respect to the runway surface 65 as illustrated by FIG. 6. (Model vertical beam patterns 70 of the FOD radar at 78, 79, 80 and 81 GHz are shown in FIG. 7. The model data is shown for 8" long slotted waveguide. The half power beam width in this case is approximately 1.05 degrees which translates into 0.35 degree wide beam when the antenna length is increased to 24 inches.) Zero angle corresponds to the normal to antenna. Negative angles represent beam directions toward the ground when the normal is horizontal. In deployment the overall antenna is tilted to align its vertical FOV with the runway or other surface of interest. The angular position of the beam axis varies with frequency as shown in plot 70, hence the maximum vertical field of view of the FOD is approximately 4 degrees. As frequency sweeps between 78 and 81 GHz a 24 inches long slotted waveguide antenna having 0.35 degrees beam width and sweeping though a 4 deg wide vertical FOV forms approximately twelve resolved beams in the vertical direction. Signal strength for each beam is coded in the FOD radar image by a pixel brightness for a given target range. FOD finder therefore has capacity to form 12 fully resolved image pixels in the elevation direction and 1030 fully resolved azimuth pixels for a 360 degrees horizontal scan. As the beam stays on the target for approximately one $\frac{1}{12}^{th}$ of the 10 millisecond frequency sweep time, the effective bandwidth of the system per elevation pixel is 3 GHz/12=250 MHz, which limits system range resolution to 0.6 meters. For optimum system sensitivity the FOD radar is collecting 50% overlapping signal samples and forms a 23×2060 image of half-resolved pixels. FOD radar also generates images at 1024 range bins between 0 and 500 meters for an overall maximum size of a 3D image up to 23×2060×1024 pixels. The above image forming description is illustrated by FIG. 8. The radar 80 forms an array of 23 half resolved (50% overlapping) vertical beams for each of its horizontal angle. The receive signals are converted into vertical pixels in the image. Minimum one each up and one down frequency sweep are used to generate the 23 pixel vertical array of pixels to perform discrimination between moving and stationary targets. As the runway 81 is covered by only one or just a few pixels, especially at the long ranges, the remaining vertical pixels may not contain FOD information. The radar vertical beam scan ability permits selectively processing of FOD information only for pixels that contain data of interest. This is illustrated by FIG. 8. As the radar horizontally scans the runway 81 beams 84*a*, 84*b* and 84*c* frequency scan the entire 4 degree FOV, but only pixels 82*a*, 82*b* and 82*c* at elevation angles Ang. 1, Ang. 2 and Ang. 3 relative to horizontal 85 will be used to track FOD on the runway. A wider FOV slotted waveguide can also be designed and deployed if necessary.

Radar Electronics

In this preferred embodiment frequency scanning is utilized for two purposes: first, as explained above, for scanning the transmit beam in the vertical direction, and second to determine the distance to FOD targets. This is feasible because the frequency difference between the transmit and return signals to and from a target FOD is a linear function of the distance to the target. This relationship is explained in the following section. This section describes the electronics utilized in order to compare the transmit signals and the receive signals so as to extract this frequency difference and to convert it to range.

FIG. 1 is a diagram of the electronics of the preferred radar system. Transmitter 2 and receiver 1 of the FOD radar use a high-stability phase locked 12.25 GHz oscillator 5 (such as Model PLO-2000 supplied by Microwave Dynamics with offices in Tustin, Calif.) as a reference for generating mm-wave signals. The 12.25 GHz signal is initially converted to 36.75 GHz by a frequency tripler 7*a* (such as Model CHX 1094-99F supplied by United Monolithic Semiconductors with offices in Orsay, France) in receiver and 7*b* in transmitter and then converted to 73.5 GHz by a sub-harmonic mixer 8*a* in receiver and 8*b* in transmitter. In the process of frequency conversion the resulting signals are amplified to appropriate levels by amplifiers 15, 16 and 18 (such as Models HMC-APH510 and HMC-AUH318 supplied by Hittite Microwave Corp. with offices in Chelmsford, Mass.). A low phase noise voltage controlled oscillator 6 (such as Model HMC-0028 supplied by Hittite Microwave Corp. Chelmsford, Mass.) generates a linear frequency modulated signal spanning 3 GHz from 4.5 GHz to 7.5 GHz. A frequency modulated transmit signal between 78 GHz and 81 GHz is generated by mixing 73.5 GHz and the voltage controlled oscillator signal in a harmonic mixer 8*b*. The resulting signal is amplified by a power amplifier 9 combining four power amplifier MMICs (such as Models HMC-APH333 supplied by Hittite Microwave Corp. with offices in Chelmsford, Mass.) to a power level of approximately 200 milliwatts and the amplified signal is transmitted from the transmit antenna 4 through a transmit-receive isolation circuit 27. To ensure signal coherence and to achieve high range resolution, as indicated in FIG. 1, the same 12.25 GHz reference and a voltage controlled oscillator sources are employed as local oscillators for up-down conversion of transmit and receive signals by using two way in phase power dividers 25 and 17.

Figure 9A:
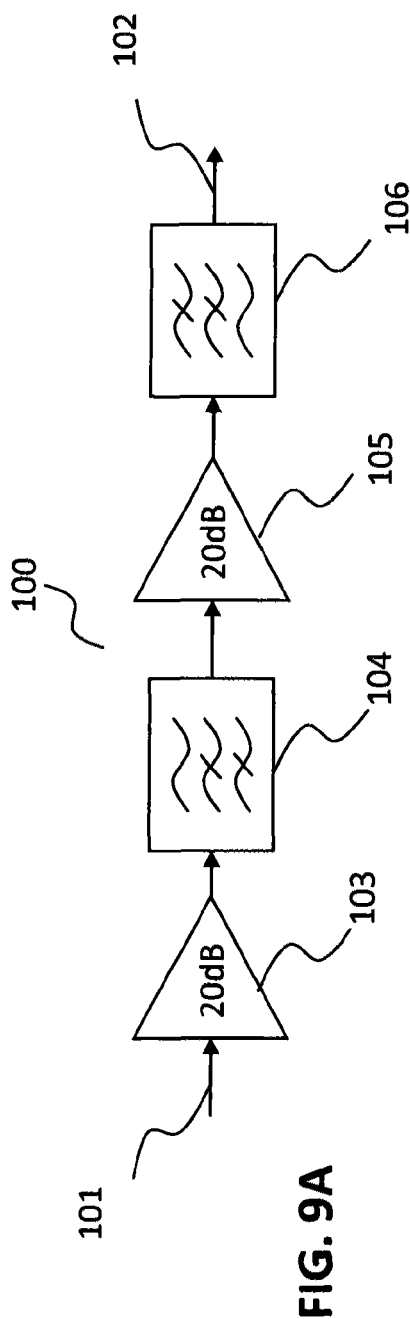
FIG. 9A shows block diagram of the logarithmic frequency response amplifier.
Figure 9C:
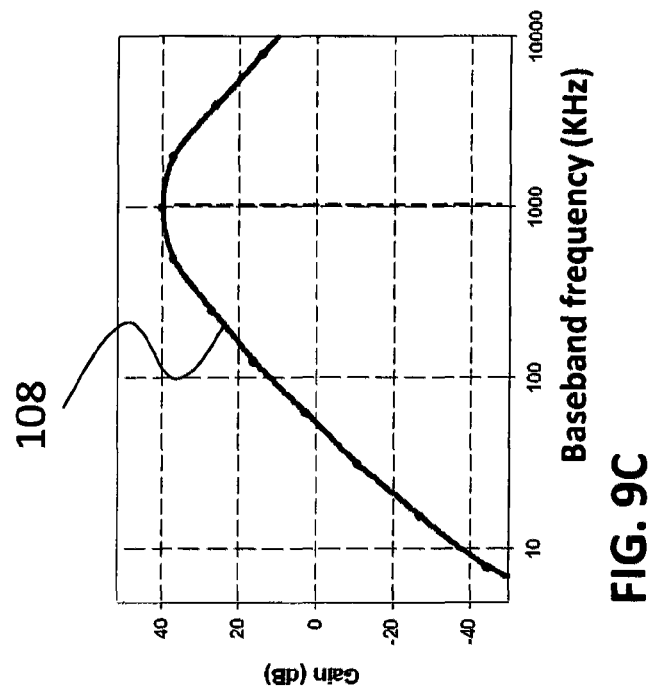
FIG. 9C is the gain characteristics of the logarithmic frequency response amplifier.
Figure 9B:
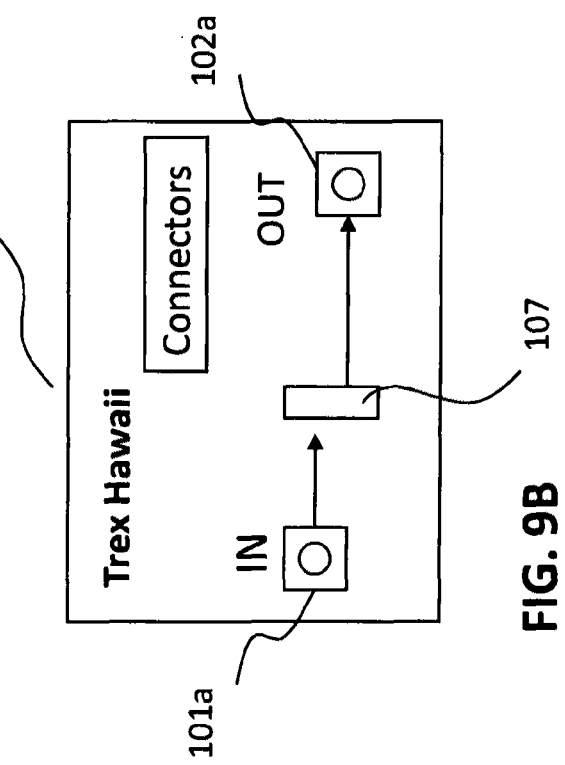
FIG. 9B is a diagram of the logarithmic frequency response amplifier circuit board.

The transmit signal reflected from the targets is collected by the slotted waveguide 41 in the antenna 4 and after passing through the isolation circuit 27 is amplified by a low noise amplifier 10 (such as Model 86LN4D supplied by HRL Laboratories, LLC with offices in Malibu, Calif.). The amplifier has a typical gain of +20 dB and noise figure of 5 dB. The amplified signal is initially down converted by mixing it with 73.5 GHz local oscillator signal in a first mixer 11. The output signal of the mixer is amplified by a three stage 50 dB gain amplifier 12 (such as Model HMC396 supplied by Hittite Microwave Corp. with offices in Chelmsford, Mass.) followed by a down conversion in the second mixer 13 (Model HMC129 supplied by Hittite Microwave Corp. with offices in Chelmsford, Mass.) to a base band DC—1.25 KHz frequency range using signal from voltage controlled oscillator 6 spanning 3 GHz from 4.5 GHz to 7.5 GHz as local oscillator. The output signal of the second mixer 13 is amplified by a specially designed base band amplifier 14 as described in detail below which brings signal to a level suitable for digitizing, removes signal level dependency on the range of the target and filters out signal components that correspond to ranges shorter than 20 meters and longer than 500 meters. It is well known from the radar theory that the power of the return signal from a small target is inversely proportional to the fourth power of the target range. If the target range increases by a factor of two, the return signal power intercepted by the radar decreases 16 times or 12 dB. The base band logarithmic frequency response of amplifier 14 of the FOD radar has 12 dB per octave gain slope as shown in FIG. 9C. Amplifier 14 significantly attenuates returns at frequencies below 40 KHz corresponding to the ranges of 20 meters or less, whereas it amplifies signals by +40 dB at frequencies of 1000 KHz corresponding to the maximum FOD radar range of 500 meters as shown in FIG. 9C. Block diagram 100 and its circuit board diagram 100a for amplifier 14 are shown in FIG. 9A and FIG. 9B. A base band signal from the $2^{nd}$ mixer 13 (FIG. 1) is connected to the input 101 of amplifier 14 and a signal from its output 102 is connected to an anti-aliasing (low pass) filter 26 (such as model LTC1566-1 Low Noise 2.3 MHz Continuous Time Low pass Filter made by Linear Technology Corp.) and then to digital to analog converter 20 (FIG. 1) operating at 10 million samples per second sampling rate. Signal input 101a and output 102a ports of amplifier 14 are also shown in FIG. 9B. The amplifier consists of a first 20 dB gain block 103, a second order active high pass filter 104, a second 20 dB gain block 105 and a second order active low pass filter 106 as shown in FIG. 9B. Both filters have 1000 KHz cutoff frequencies, which, in combination with the gain blocks, provide a frequency response 108 shown in FIG. 9C. The entire circuit is realized using a four channel ultra low noise, high precision operational amplifier integrated circuits 107 (Model AD8674 supplied by Analog Devices Inc. with offices in Norwood, Mass.).

Distance Calculations

The frequency difference between the transmit signals and the return signals is a linear function of the range to the target. The output signals of the receiver are used to determine the distance to the FOD objects. The signals are monitored to detect high intensity peaks exceeding a predetermined threshold indicating reflection from a FOD object located in the field of view of the radar. Distance to a FOD object is determined from the frequency of the measured peaks. In this embodiment the frequency range of the analyzed signals is 0 to 1000 KHz. Given sweep time of 10 milliseconds, the rate of change of frequency $\Delta f/\Delta t$ is $3 \times 10^{11}$ Hz/s. The distance traveled by the millimeter wave beam at the speed of light c is twice the distance R to the target FOD object. So the distance R to the target can be determined by the following equation:

$$R = \frac{fc}{2\Delta f/\Delta t} = (0.5 \text{ m/kHz})f$$

Therefore a peak at a measured frequency f of 1000 kHz would indicate a target at 500 meters.

Isolating Frequencies

Once the receive signal strength of the radar is made independent of the range by the logarithmic frequency response amplifier 107, it can be described as a sum of sinusoidal signals whose amplitudes are proportional to the radar cross section of targets and their frequencies proportional to the range. Applicants use Fast Fourier Transform (FFT) processing as indicated at 21 in FIG. 1 to determine the amplitude and frequency of the signals. As shown in FIG. 1, the output of the FOD receiver is digitized by an analog-to-digital converter 20 at a sampling frequency of 10 million samples per second and then processed into a Fourier power spectrum using a Field Programmable Gate Array chip in an FFT processor 21. Details of the FFT processor are described in the next section. Real time FFT power spectra each containing 1024 frequency components with the component magnitude resolution of 16 bit are communicated to a computer 22 where the data is converted into FOD images. Alternatively the digitized time signal can be passed directly to the computer CPU for numerical FFT processing and conversion to FOD images. A dedicated computer 22 located within radar system processes FOD images, identifies FOD targets, communicates data to system operator, controls turntable 19 to perform horizontal sweep of the radar antenna, tracks radar position, automatically controls visible and/or IR camera used for alternate target imaging, supports tools for collecting, storing and processing a database of the FOD and other targets.

Signal Digitizing and FFT Processing

Figure 2B:
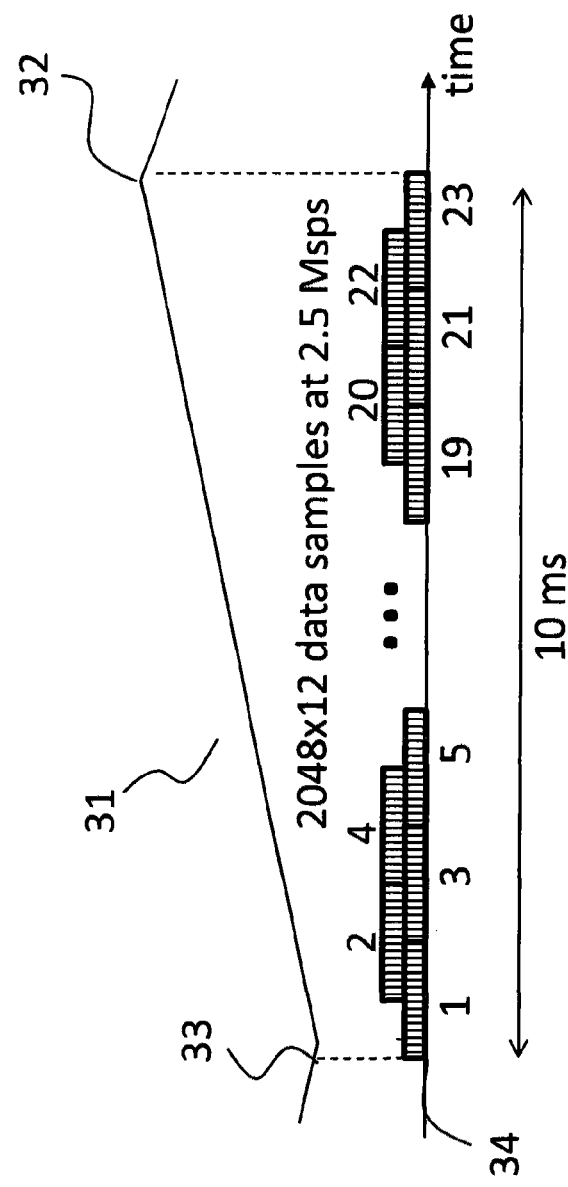
FIG. 2B illustrates alignment of the digitized signal data intervals relative to the frequency sweep waveform.

FIG. 2B provides additional details of the FOD radar signal digitizing and FFT processing. As shown in FIG. 2B, a single channel analog to digital converter 20 digitizes receiver voltage at a sampling rate of 10 million samples per second in the range between −1 volt and +1 volt with 16 bit resolution. Four consecutive signal samples are averaged for an effective sampling rate of 2.5 million samples per second. The signal is digitized continuously and fed into an FFT processor 21 shown in FIG. 10. There the signal is buffered into a synchronous memory SRAM 151 and the digitized data is grouped into 2048 consecutive data point samples suitable for the FFT processor. Each sample is multiplied by a Hamming window in FPGA in processor 21 before fast Fourier transform processing. The window reduces side-lobe level of the Fourier responses caused by finite length of the samples. Samples from SRAM 151 are read into the FFT processor at twice the sampling rate for continuous FFT processing of the samples with 50 percent overlap in time. Overlapping of samples prevents signal loss due to the widowing and in effect results in half resolved (vertical angle oversampling) beams.

Figure 10:
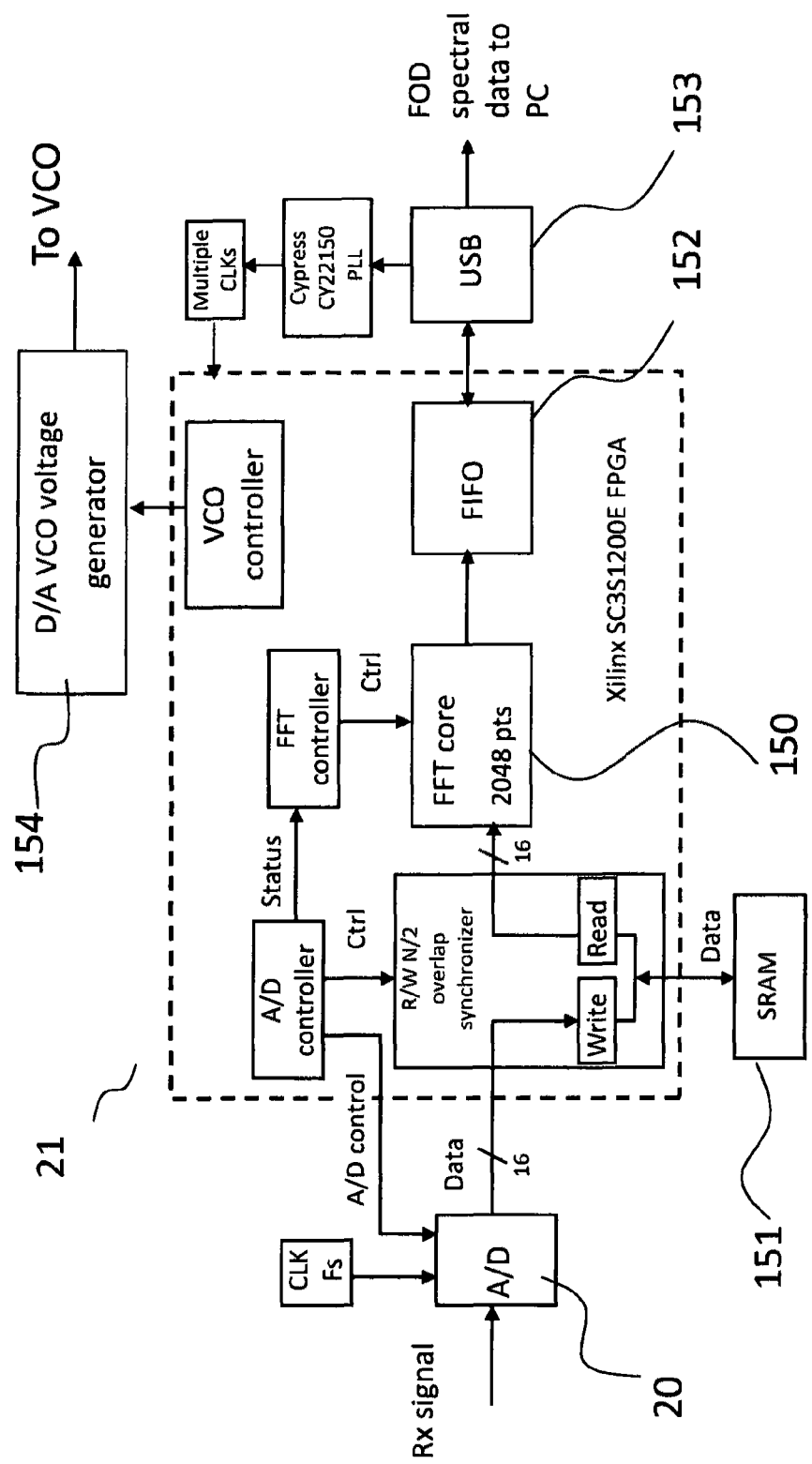
FIG. 10 is block diagram of the data acquisition and FFT processing circuit.
Figure 11:
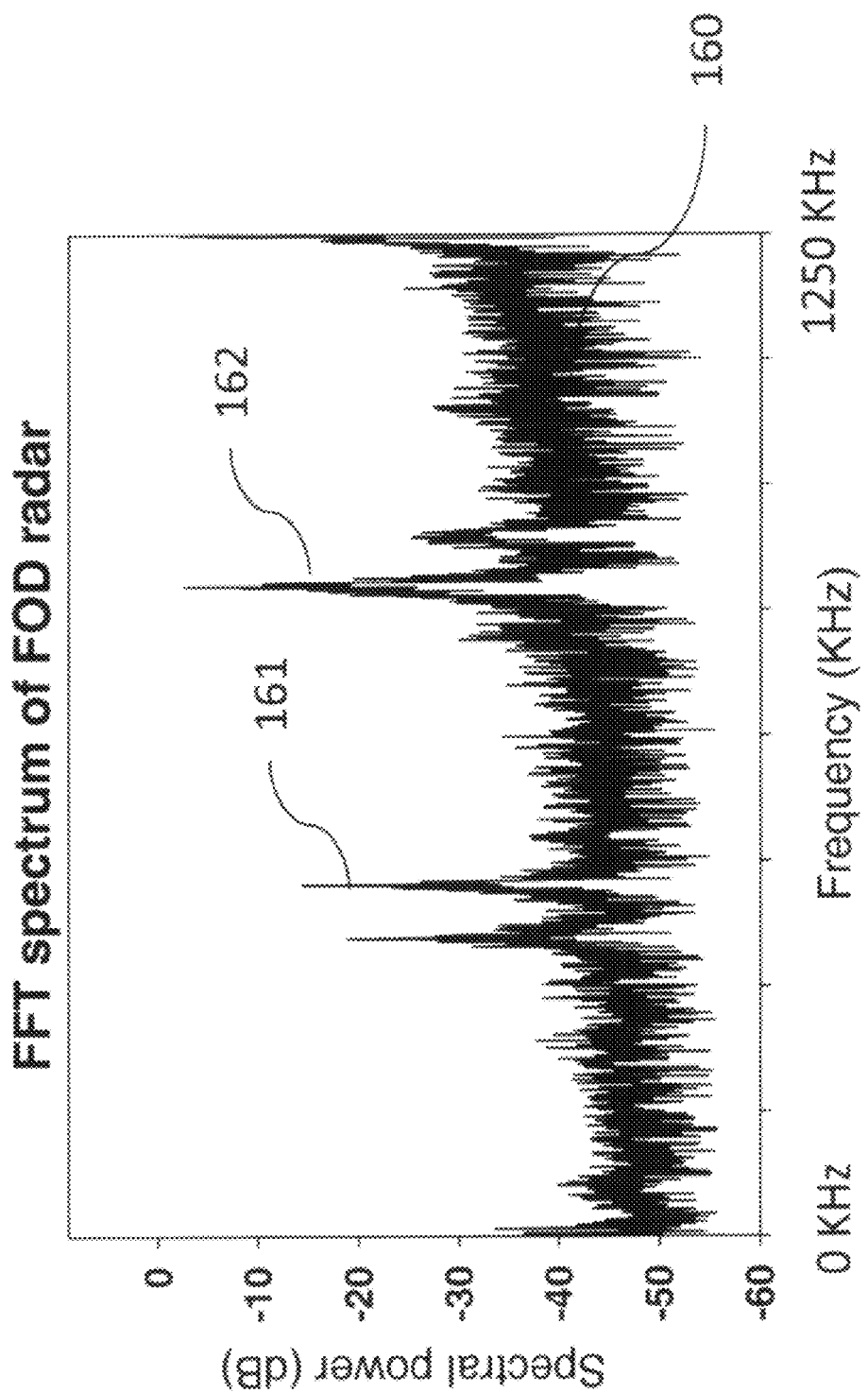
FIG. 11 shows an example of the FOD radar FFT spectrum with multiple in its beam.

Signal sampling is synchronized with the triangular voltage controlled oscillator frequency sweeps 31 as indicated by comparing FIGS. 2A and 2B. The first sample 34 begins at the start 33 of the linear frequency sweep 31. The next sample #2 overlaps sample #1 by 50 percent of its length. Sample 3 overlaps with the preceding sample 2 and so on, all as shown in FIG. 2B. A total of 12 non overlapping (or 23 overlapping) signal samples each sample containing 2048 data pints are acquired per each up- or down-linear frequency sweep for a total of 2048×12 data points at 2.5 million samples per second rate. Samples coinciding with the sweep reversal points 33 and 32 are discarded as shown in FIG. 10. The FFT spectra of the FOD radar signal samples are processed in an field programmable gate array (FPGA) based FFT processor 21 which, in parallel with computing FFT spectra, also controls data streams for the A/D module 20, SRAM memory in FFT processor 21, linear frequency sweep D/A voltage generator 154 for the VCO and a USB interface 153 to computer 22. In this preferred embodiment a Xilinx SC3S1200E FPGA chip, containing 1.2 million gates, is used. (FPGA vendor Xilinx Inc. has offices in San Jose, Calif.). A USB interface to PC 22 is based on Cypress Semiconductor USB micro-controller chip CY68013A. (A larger FPGA would allow greater processor flexibility at a higher cost.) FFT processor 21 is created in the FPGA by programming into the FPGA an FFT core provided by Xilinx. An example of the FOD radar FFT power spectrum 160 is shown in FIG. 11. Peaks 161 at 162 in the spectrum represent a response from FOD objects at two different ranges. In other preferred embodiments the FFT power spectrum is computed numerically in the computer's CPU. In this case processor 21 would not need the FFT function.

Linear Frequency Sweep Generation in VCO

In this preferred embodiment field programmable gate array processor 21 synchronizes the radar signal readout and VCO frequency sweep by controlling output of voltage generator 154 as shown in FIG. 10. Generator 154 contains a microprocessor that outputs digital voltage data stored in its memory to a digital to analog (D/A) converter based on Texas Instruments Inc. chip model DAC8811 which includes a voltage controlled oscillator. The data output is triggered by an FPGA Sync signal. VCO oscillators typically have a nonlinear voltage frequency characteristic. The digital voltage data is adjusted to reduce this non linearity and ensure highly linear frequency sweep of the VCO with time. A stepwise output of the D/A converter is smoothed by a high order low pass filter before it is applied to the VCO sweep control port. (In other preferred embodiments the sweep voltage is produced using an analog ramp generator with controllable slope, curvature and higher derivatives so as to eliminate the stepwise discontinuities characteristic of the digital ramp generator.)

Mitigation of Transmit-Receive Interference

Figure 12:
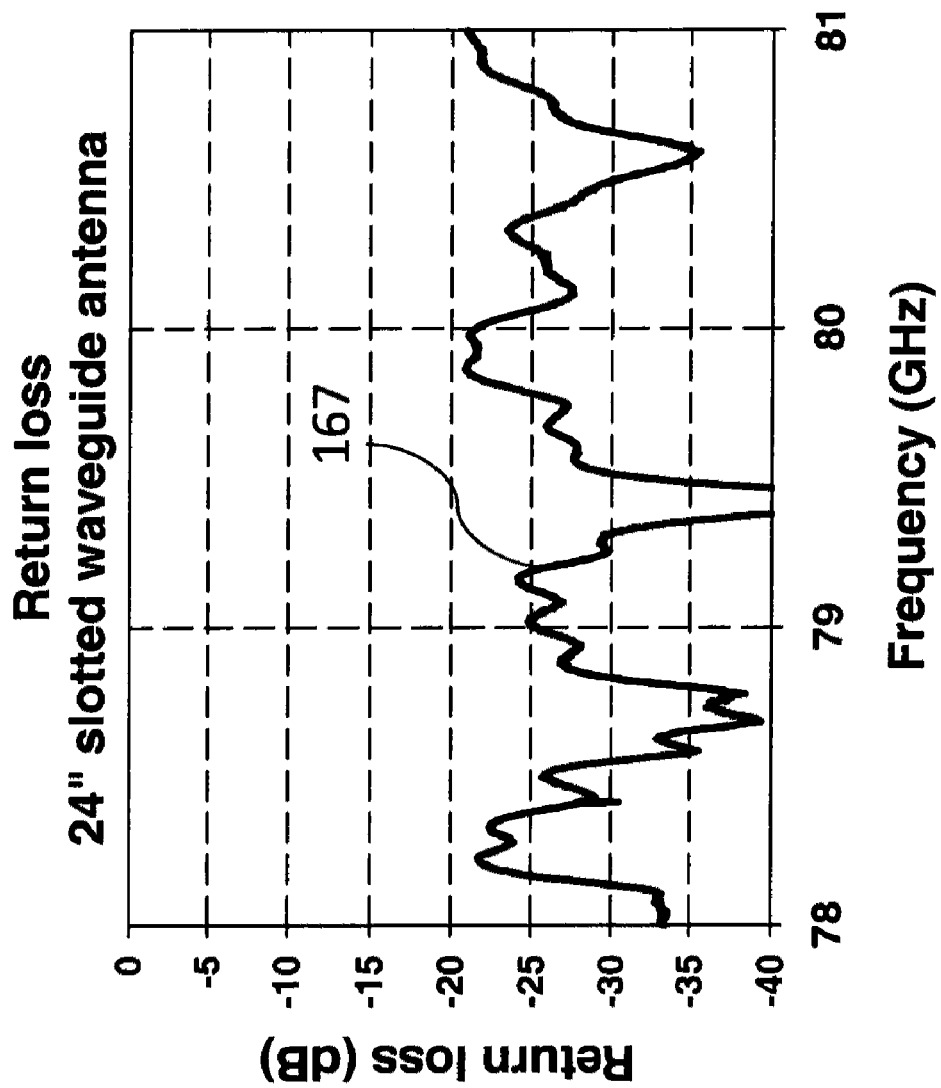
FIG. 12 shows typical plot of the slotted antenna return loss in the 78-81 GHz frequency range.
Figure 13B:
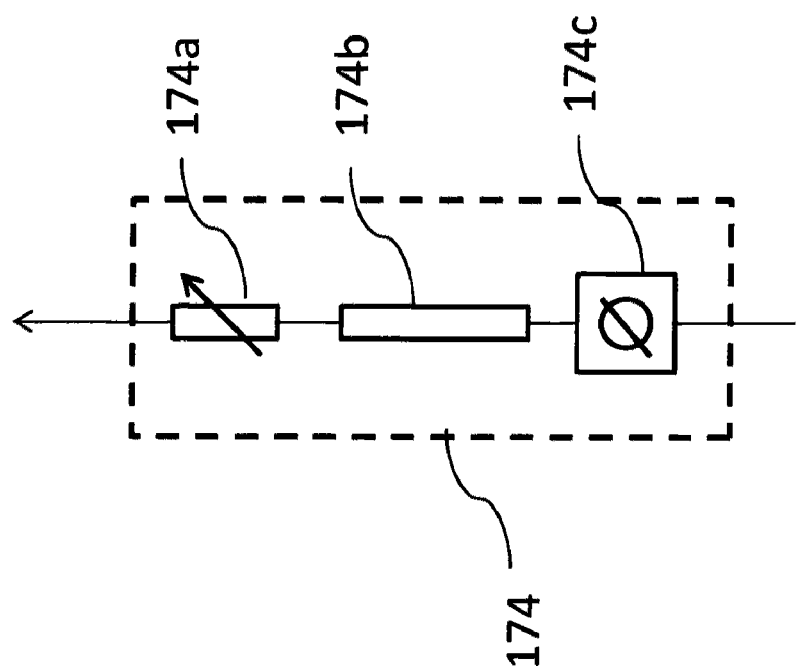
FIG. 13B shows block diagram of a simple phase cancellation module.
Figure 13A:
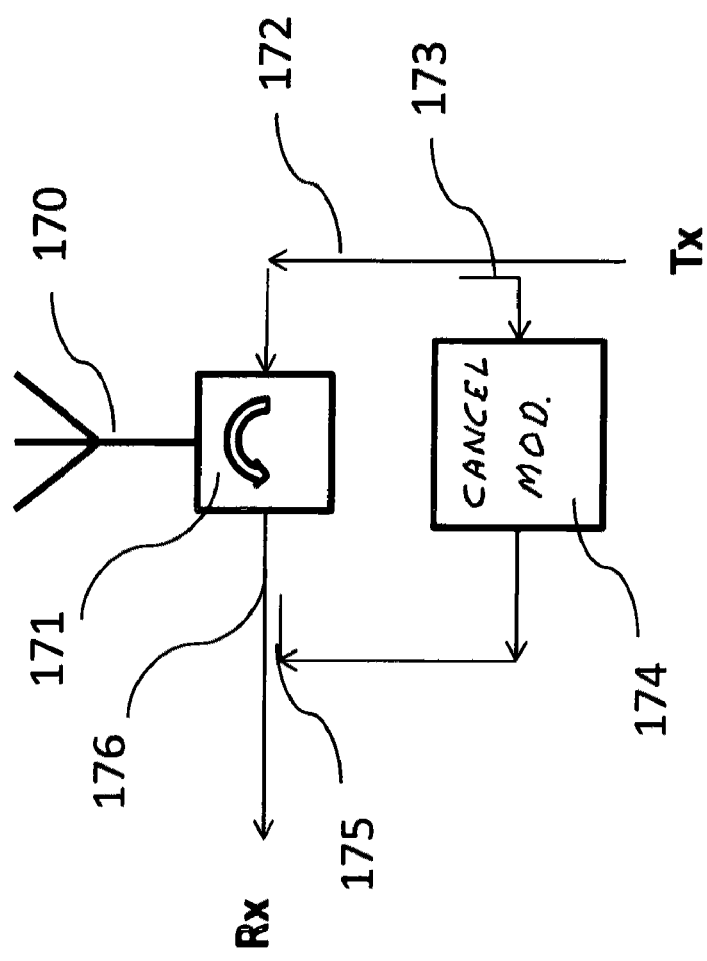
FIG. 13A is the block diagram of the phase cancellation circuit for improving isolation between transmit and receive channels of the radar.

The proposed FOD radar uses a common antenna for transmit and receive of millimeter wave signals to maximize its gain and range of operation. The transmit and receive channels have to be adequately isolated or high power transmit signal can leak into the receive channel and interfere with FOD detection. The leakage takes place in the coupler 27 (FIG. 1) that connects transmitter and receiver to the antenna and in the slotted antenna due to reflection of transmit signals from the antenna components. The relative strength of these reflected signals is referred to as return loss of the antenna. The system uses a three junction circulator (such as model QJY manufactured by Quinstar Technologies Inc., Torrance, Calif.) to couple signals into and out of the antenna and to isolate transmit and receive channels by approximately 35 db. The circulator constitutes part of the isolation component 27 shown in FIG. 1. Typical average return loss data 167 of the 24 inches long slotted waveguide antenna is approximately −25 dB as shown in FIG. 12, which is the dominant source of the transmit-receive interference. In the preferred embodiment a custom designed leakage cancellation circuit based on a phase cancellation technique is used. A block diagram of the circuit is shown in FIGS. 13A and 13B. A small portion of the transmit signal is tapped off in a coupler 173 and injected into the receiver after its modification in the cancellation module 174. Module 174 adjusts the amplitude and phase of the tapped transmit signal such that it has same magnitude and opposite phase of the leakage signal when it is injected into the receiver through the coupler 175. The leakage signal forms as the transmit signal propagates in the path 172 to the circulator 171 into the antenna 170 and, by reflection, through the path 176 into receiver Rx. In the process the signal magnitude falls by approximately 25 dB and its phase changes proportional to the frequency of the signal and the electrical length of the leakage path between transmitter and receiver. A simple cancellation module 174 consists of an attenuator 175a, a delay line 174b and a phase adjustment component 174c connected in series as shown in FIG. 13B. The attenuator permits adjustment of the magnitude of the leakage cancellation signal, whereas delay line and the phase tuner set its phase. A more complicated circuit would involve multiple delay lines and phase adjustment components to achieve a close match to non-uniform amplitude of the leaking signal vs frequency such as shown in FIG. 12. Specific design of the circuit will require precise measurements of the leakage signal, characteristics of the couplers 173, 175 and components used in the module 174. The measurements can be performed with millimeter wave Vector Network Analizer such as Rohde & Schwartz Model R&S ZVA110. Circuit optimization for best isolation can be performed using AWR Microwave Office modeling software. Transmit-receive isolation has to be just sufficient to prevent overloading and saturation of linear amplifiers in the receive channel. Due to very short propagation path compared to the path to and from the FOD targets the interference signals will appear at near zero baseband frequencies and will be rejected by the logarithmic frequency response amplifier 14 (FIG. 1). A carefully designed phase cancellation circuit can improve isolation between transmitter and receiver by an additional 20 dB or more, for a total isolation of approximately 45-50 dB.

Discrimination between Moving and Stationary Targets

An important requirement for the stationary FOD system is the ability to operate and detect FOD during air traffic and other airport activities on the runways, taxiways and other areas. The main objective of the system is to detect FOD objects on the ground and avoid being tripped by the moving objects such as airplanes, vehicles, people, wildlife etc. The system uses Doppler frequency shift effect, multiple azimuthal scan data and persistence analysis to discriminate between moving and stationary targets. The Doppler effect permits instantaneous identification of the moving targets but only if they move toward or away from the radar system. Target movement perpendicular to the antenna beam does not produce Doppler shift which may trigger false FOD detection. Confirmation of the moving target at different azimuth angles as well as persistent observation of the target in the same location will help resolve ambiguous situations and prevent false alarms. Details of the Doppler based target analysis is illustrated by FIGS. 14A and B and 15A and B.

Figures 14A, 14B:
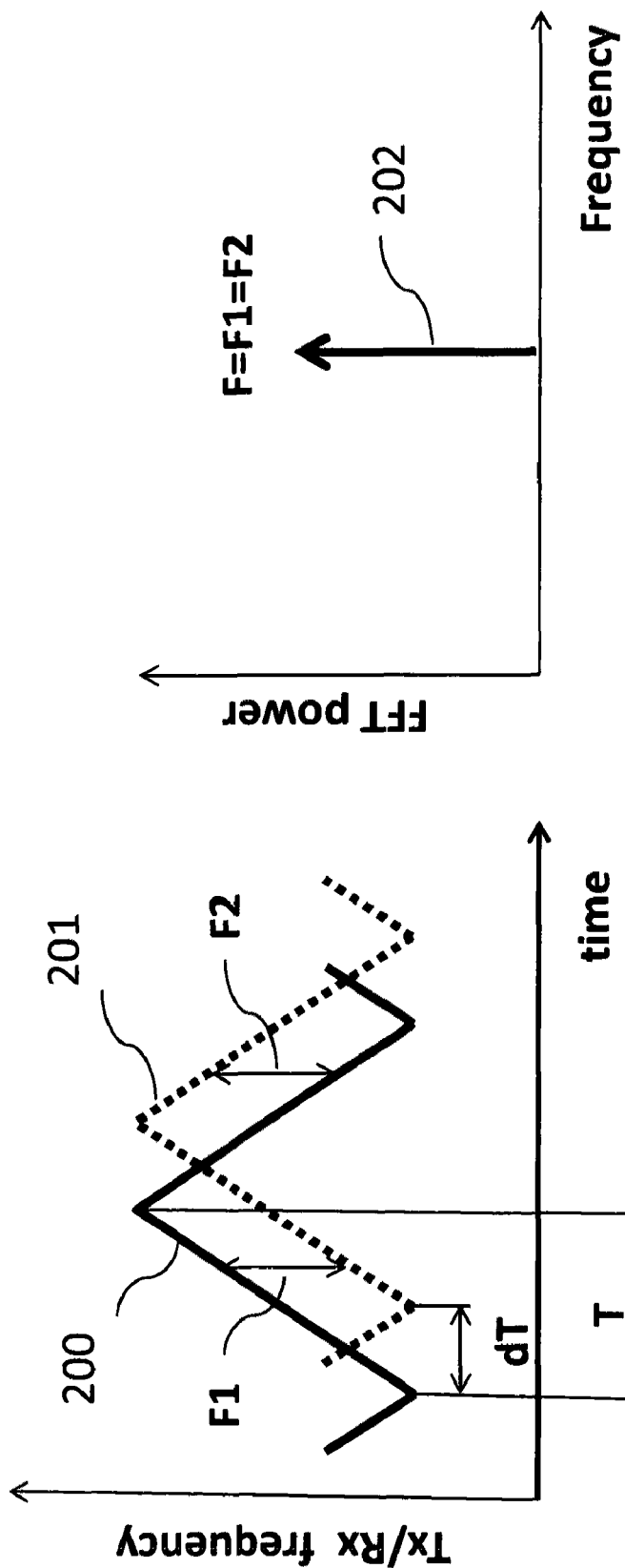
FIG. 14A illustrates transmit and receive frequency sweep waveforms (ramps) for a stationary FOD target.
FIG. 14B illustrates an FFT spectrum of the FOD radar for a stationary target.

The case of stationary FOD target is described by FIGS. 14A and B. The triangular receive frequency scan waveform 201 is delayed relative to the transmit waveform 200 by the roundtrip propagation time delta T of the signal. As a result, there is a F1 and F2 frequency difference between transmit and receive signals at any given time and it is the same for both positive and negative ramps of the waveform (F1=F2). The baseband FOD FFT spectrum will display a peak at the same frequency F independent of the direction of the frequency sweep. The frequency difference F=F1=F2 is proportional to the distance to the target.

Figure 15B:
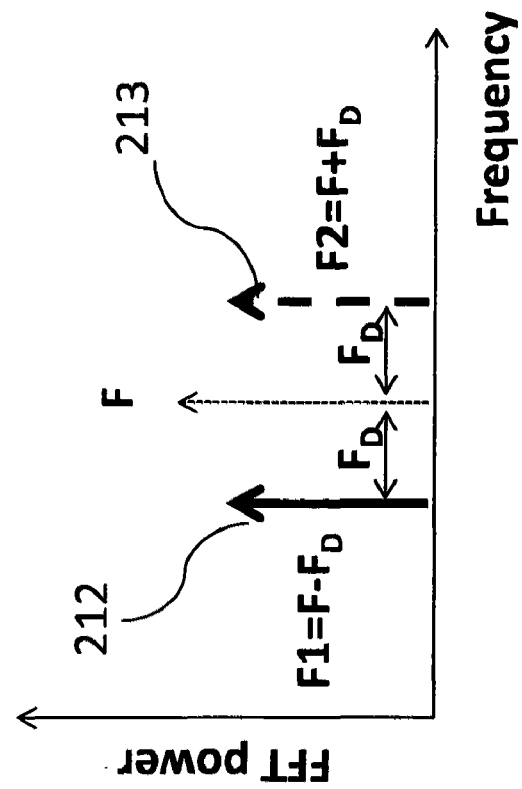
FIG. 15B illustrates FFT spectra of the FOD radar for a moving target.
Figure 15A:
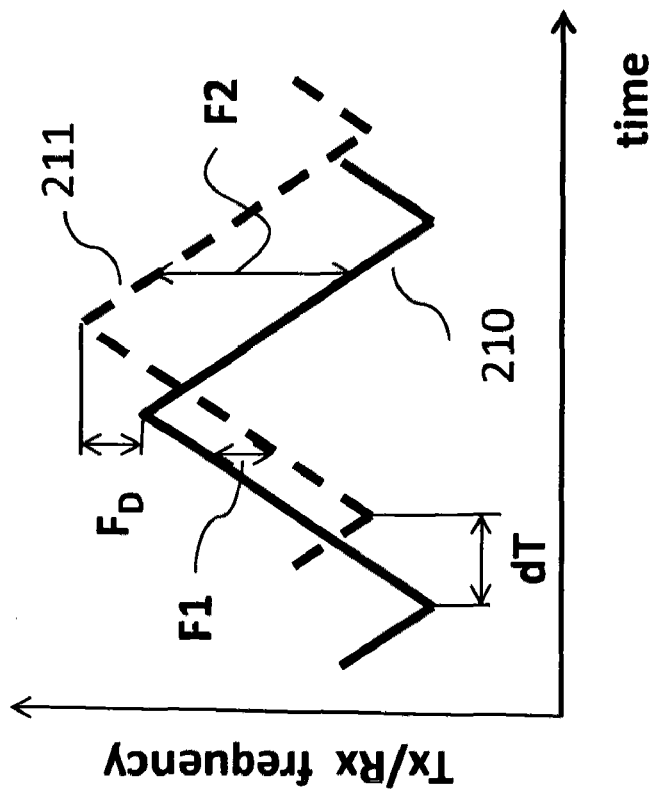
FIG. 15A illustrates transmit and receive frequency sweep waveforms (ramps) for a moving target.

If the target has a non-zero velocity component parallel to the axis of the radar beam, the receive frequency waveform 211 will be shifted relative to the transmit waveform 210 not only in time, but also in frequency by the amount of the Doppler shift $F_D$. As illustrated in FIG. 15A, the frequency difference F1 and F2 for the up- and down sweeps are no longer equal and will generate peaks in different FFT bins 212 and 213 of the FFT spectrum depending on the sweep direction as shown in FIG. 15B. The distance between the peaks in the spectrum will characterize the speed of the target to or from the radar, whereas average frequency F will correspond to the distance to the moving target similar to the stationary targets.

The FOD radar software tracks peaks that exceed the detection threshold and will identify stationary targets by how repeatable is peak position during up and down slopes of the triangular frequency sweeps. Long term target persistence analysis will use multiple scans across the same area to reduce the rate of false alarms.

False Alarm and Sensitivity Mitigation Using Baseline Measurements

The rate of false FOD detection and system sensitivity can be significantly improved where and when operation conditions allow accumulation of the radar image in the absence of the FOD. This option is further referred to as the baseline measurement. The radar image contains all objects within it field of view, most of which are not FOD, but imperfections in the runway surface, permanent equipment such as lights, signs etc. An image of this permanent (or persistent) environment can be collected during baseline measurements and subtracted from the images during regular surface scans. Ideally the baseline measurements will be performed immediately after the surface has been cleaned of all debris. The baseline image is averaged using multiple scans to minimize the effect of random factors. Once the baseline is subtracted from the radar image it will display no targets unless a previously non-existing target is introduced on the surface. The baseline subtraction technique permits reduction of the detection threshold for detection of smaller and more distant FOD targets without the risk of being triggered by the permanently present ones. The baseline measurements have to be periodically updated due to the temporal drift of the system gain.

Platform of the FOD Finder

The antenna assembly is mounted on an electronic turntable which rotates to sweep the radar in azimuth (horizontally) through a specified sweep range. A programmable turntable, provided by Intellidrives, Inc (with offices in Philadelphia, Pa.) provides a capability to specify any sweep range or to select continuous rotation. In the preferred embodiment the mechanical scan of the antenna is used for a computer generated horizontal raster image representing 1030 angles for a 180 degrees wide horizontal scan direction. The chirp period of the radar is timed with the rotation speed so that the radar executes at least one each up- and down-full elevation scan as it rotates through one increment of the azimuthal angle.

The radar is protected from weather by a radome. The radome is made from thin plastic material such as polystyrene which is almost completely transparent to millimeter waves. A PTZ visible and/or infrared camera is mounted on the outside of the radome as well as wireless communication antenna. The radome size provides sufficient room for the antenna mounted on a turntable 19 to rotate horizontally 360 degrees and collect images in any direction. Transmit and signals pass through the radome with little attenuation and scan with frequency up and down within a 4 degrees wide vertical field of view as explained above. The vertical field of view is adjusted from the top mounting platform to the ground to allow imaging of FOD items between 20 and 500 meters range. The antenna mount will allow mechanical adjustments for alignment of the radar field of view with the area of interest.

GPS/INU

This preferred embodiment optionally incorporates a differential global position sensor (DGPS) unit. This component is integrated with the radar through software including a display algorithm which shows the radar operator his location on earth and identifies the direction in which the radar is oriented. The DGPS unit is connected to the computer (PC).

External Camera System

This preferred embodiment may incorporate a point-tilt-zoom camera enclosed in an all weather enclosure. This camera is designed to capture an image of the foreign object debris at the point of discovery. The FOD discovery conditions are imaged, recorded and reported over the Internet via computer 22 and a wireless transceiver (not shown). The camera is automatically slewed to the detected FOD items as directed by computer 22. The Time, Date, Group and the conditions of the object detection are recorded to the Internet database onboard and by communication to the main database at the airport center using wireless connection. Time and Date are determined automatically whereas object group and detection conditions can be manually selected by the operator from the FOD software menus.

FOD System Operation

In this preferred embodiment red dot icons in the image represent radar returns exceeding a pre-determined threshold regardless of the item size and signal level above the threshold. Each icon is placed sequentially based on time of detection and all are numbered sequentially in the database as they are placed at the detected locations on the overhead view satellite map. Only returns confirmed by multiple sweeps are displayed. At the time of initial detection the dot is displayed in yellow. When multiple detections confirm that it is a stationary object the dot color is changed to red and an audible warning is sounded to alert the operator that FOD has been found.

To further improve system performance additional designated areas can be defined within a larger detection area representing known permanent structures such as runway centerline lighting. Signals from such structures can be automatically removed or corrected in the image to permit detection of FOD items that may be located close to runway infrastructure objects.

The latitude, longitude, time of detection, the person who detected the object, the airfield location, the date and multiple images of the detected item are collected and stored in an onboard database. FOD item coordinates and time of detection are automatically determined by the PC using GPS/INU and system clock. Operator name is also automatically determined from the system operator shift schedule stored in PC memory or from the Internet. FOD images are collected using external and internal cameras as described above. At the conclusion of the collection, all the data is synchronized with an Internet database via a wireless link.

In the event a FOD item is spotted without the FOD finder detecting it or something blowing on the runway after the radar sweep has gone past the area, the user can manually place a red FOD dot on the screen. The system then logs all the details for the current vehicle location. The rest of the process is identical to the radar detected FOD.

In the event that a FOD detection should be rejected (bird/wildlife/aircraft/person) item moves or it cannot be picked up, the operator selects "Reject", but the data remains in the database. An example would be a bird that lands on a runway, is detected and then flies away. This would be logged as reject due to animal movement.

Air Boss™ Software

The FOD finder runs on an Air Boss™ software system created by the Applicants. This software turns all FAA Part 139 checklist items for airfield management into a simple to use menu system with standardized responses for entry. It reduces the amount of typing/note taking to a minimum by creating standardized response checklists based on the limited amount of variables to each item. For example, if a taxiway light is burnt out, then user would touch the Air Boss logo and the 11 airfield management areas would appear on the screen. The Operator then chooses "Lighting" and a six lighting sub areas appear on the bottom right of the screen. The operator would pick "Runway lighting out" and touch the appropriate light on the satellite image. The Runway light out symbol would then appear on the screen in that location and all location and time details are sent to the database. In addition, an email, text or phone message work order is sent to the appropriate repair agency. All actions from discover to repair is tracked on the database and meets the FAA requirements for documentation of airfield management.

The Air Boss software also includes information from the Internet which is combined to provide situational awareness to the operator. This information includes the flow of aircraft to and from the airport, aircraft details, gate information, flight status, airfield status, weather, NOTAMS and other pertinent information essential for the management of the airfield operations and available via multiple commercial and government databases.

The Air Boss software also assists in preventing runway incursions. As the vehicle approaches areas of the airport that are off limits or require coordination with a controlling agency, the software alerts the driver audibly with a voice warning and instructions to contact the controlling agency and visibly by placing a stop sign on the touch screen with written instructions to contact the controlling agency. All features of the FOD Finder are disabled until the driver touches the stop sign acknowledging the instructions. All of the driver actions are recorded in the database. The FOD Finder also images the surface of the runway/taxiways for management of its condition. It can detect cracks, holes and other key part 139 details for surface management. The data from all the databases is provided to the users on a regular basis for analysis, prevention and maintenance in a number of airfield areas.

Recent FOD Finder Modification

Applicants' current preferred embodiments include the following additional features as compared to earlier versions.
Eight High-Definition Cameras Eight high-definition cameras have been added to the FOD Finder system providing a 360 degree view around the vehicle. This can be used as a digital recording of events or as a live feed. It was created because the Airport director at O'Hare has an office below ground and can never see what is happening on the airport surface. So these cameras allow him a live feed to see how his team is responding to various events.

Performance Test Results

The major advantage of FOD Finder radar is the method in which detection of FOD is accomplished which focuses on speed and reduction of false alarms. This advantage is evident when the various FOD systems were compared by the United States Federal Aviation Administration and similar comparison testing in China. Applicants' FOD Finder recorded 100% detection rates with no false targets. These two factors are also critical to successful integration with airport aviation operations in order to minimize impact to aircraft traffic flow.

Applicants' FOD Finder radar sweeps approximately 180 degrees or 2000' of runway length (typical installation) in 12-15 seconds. The logic of the algorithm is formatted so that a FOD object has to be detected 3 consecutive times before a warning/alarm confirming that a FOD item is present, as explained above. During the first detection, the FOD items specific location is recorded and a yellow dot is placed on the map to provide early warning to the operator that an object has been detected. The FOD Finder system continuously processes the detected object via combined computer software and radar detections to verify whether it is a FOD item or not.

During the second and third sweeps of the item, if its location has not changed, the system will turn the yellow dot into a red dot and an alarm is sent to the operator. This entire process was recorded in testing to take 51 seconds. In comparison, a competitive system was recorded in the same testing to take 2 to 4 minutes to perform a sweep and report detection. In these tests, the FOD Finder detected 100% of all targets while the other systems were only able to achieve 30-60% detection rates of the same targets.

While the above description contains much specificity, the reader should not construe these as limitations on the scope of the invention, but merely as exemplifications of preferred embodiments thereof. Those skilled in the art will envision many other possible variations within its scope. For example in addition to the preferred embodiment described in the main text of this application, the Applicants also envision future alterations of the design to reduce cost and/or increase range and/or performance of the radar FOD detection system.
Polarization Agility Antenna polarization agility can be introduced in the form of a rotating cylinder inside of, the FOD Finder radome with quarter-wave polarization rotating plates comprising two overlapping half-cylinders at the heights of the receive and transmit antennas respectively. Using a motor or other means to select the orientation of this cylinder relative to the FOD Finder viewing direction, the operator can select to transmit and receive vertical polarization (the current default), transmit vertical and receive horizontal, transmit and receive horizontal, or transmit horizontal and receive vertical polarization. Other antenna types, for instance patch arrays, can also be used in conjunction with varactors or ferrite elements to affect polarization characteristics more rapidly. The theory for using polarization characteristics of radar return to aid in the detection and characterization of small targets is well known.
Phased Array Receiver Applicant has demonstrated a variant of the FOD Finder Radar in which the receive antenna and radio receiver were implemented in the form of a multi-element phased array. In this embodiment, the need for mechanical scanning in azimuth is obviated by the ability of a beam-forming processor to simultaneously record and process returns from all azimuth positions without rotating the phased array antenna. At present, cost considerations preclude adoption of such a system architecture, but millimeter-wave component pricing trends project to an affordable phased array solution within 5 years. Applicants' employer has patented an alternate version of the phased array antenna, U.S. Pat. No. 6,037,908, for which a built-in beam forming processor incorporates a translatable output horn which sequentially samples azimuth beams to sweep the radar's azimuth pattern without changing the antenna's orientation. This latter antenna eliminates the need for a mechanical rotation stage, without the added cost of a multichannel phased array receiver.

Wider Frequency-Scan Field of View

Adoption of a serpentine antenna slot array can be used to increase the elevation field of view of the FOD Finder beyond its current limit of 4 degrees. Alternatively, any of a number of multi-focusing techniques, including bending antenna slot arrays or reflectors in the current geometry, or adopting a center-fed slot array, can act to increase elevation field of view.

Edge Detection and Emergency Operations

The FOD radar can also be used for runway edge detection and identifying equipment on surfaces during low visibility situations. It can be used in rescue, emergency operations and to help aircrafts find their way off the runway through the "FOLLOW ME" procedures.

Other Possible Variations

The system can be mounted on a vehicle and used in the manner described in detail in parent application Ser. No. 12/806,488 (which is incorporated herein by reference) or it could be mounted on a vehicle so that it can be moved periodically to continuously of periodically monitor particular surface regions from parked positions. The system could utilize two antennas as described in the above parent application. The system could include a track and a conveyer system to convey the radar components back and forth to provide the horizontal scan. Scanning frequency ranges could be selected from a variety of ranges between 57 GHz to 100 GHz and the ranges could be smaller or larger than the specific range of 78 GHz to 81 GHz utilized in the preferred embodiment. For example a range of 10 GHz may work well in some embodiments. The reflector could be cylindrical parabolic especially for very long range applications.

Accordingly, the reader is requested to determine the scope of the invention by the appended claims and their legal equivalents, and not by the examples which have been given.

What is claimed is:

1. A long range millimeter wave imaging radar system for imaging objects located on regions of an approximately flat surface said system comprising:
    A) a frequency scanned millimeter wave surface imaging radar system comprising:
        1) production electronics adapted to produce millimeter wave radiation scanned over a frequency range of a few gigahertz,
        2) a frequency scanned antenna system adapted:
            a) to transmit millimeter wave radiation produced by said electronics in a narrow scanned transmit beam in a first scanned direction defining a narrow approximately one dimensional electronically scanned field of view corresponding to the scanned millimeter wave frequency range, and
            b) to be mechanically pivoted or scanned in a second direction perpendicular to the first scanned direction so as to define a two-dimensional field of view of a surface region,
        3) detection electronics adapted to detect millimeter wave radiation transmitted through said frequency scanned antenna system, reflected from objects in said two-dimensional field of view and collected by the frequency scanned antenna system, and
        4) computer processor equipment adapted determine location of objects located on the surface regions based on millimeter wave radiation reflected from the objects and collected by said receive antenna.

2. The imaging radar system as in claim 1 wherein the system is stationary and adapted to continuously or periodically monitor a particular surface region.

3. The imaging radar system as in claim 1 wherein the system is mounted on a vehicle and adapted for mobile imaging.

4. The imaging radar system as in claim 3 and further comprising a positioning system for monitoring the global position of the vehicle.

5. The imaging radar system as in claim 4 wherein the positioning system is a GPS system.

6. The imaging radar system as in claim 1 wherein the frequency scanned antenna system is comprised of a single antenna adapted for transmission and reception.

7. The imaging radar system as in claim 1 wherein the frequency scanned antenna system is comprised of two frequency scanned antennas, one adapted for transmission and the other adapted for reception.

8. The imaging radar system as in claim 1 wherein said system is adapted to image FOD on airport surfaces.

9. The imaging radar system as in claim 8 wherein said system is adapted to image FOD on airport runways.

10. The imaging radar system as in claim 1 wherein said first scanned direction is a vertical direction and said second scanned direction is an azimuthal direction.

11. The imaging radar system as in claim 1 wherein said first scanned direction is a vertical direction and said second scanned direction is a horizontal direction.

12. The imaging radar system as in claim 11 and further comprising a track and a conveyer system adapted to convey the radar system back and forth on the track to provide the horizontal scanning.

13. The imaging radar system as in claim 1 wherein the antenna system at least one slotted antenna and a elliptical cylinder reflector adapted to operate in a operating frequency range chosen from a millimeter wave frequency between 57 GHz and 100 GHz.

14. The imaging radar system as in claim 13 wherein the operating frequency range includes a frequency range of 78 GHz to 81 GHz.

15. The imaging radar system as in claim 1 wherein said production electronics include:
    A) a phase-locked oscillator operating at a pre-selected narrow band micro-wave frequency,
    B) frequency multiplying components for multiplying this pre-selected narrow band microwave frequency to a narrow band millimeter wave frequency,
    C) voltage controlled scanning components for generating a voltage controlled scanned frequencies scanning a frequency range of a few gigahertz, and
    D) mixing components for mixing said voltage controlled scanned frequencies with said narrow band millimeter wave frequency to produce said millimeter wave radiation scanned over a frequency range of a few gigahertz.

16. The imaging radar system as in claim 1 wherein said reception electronics include:
    A) a millimeter wave amplifier, B) a first set of down converter electronics adapted to down convert the collected reflected radiation to a microwave frequency range, C) a second set of down converter electronics adapted to further down convert the collected reflected radiation to frequencies in the range of less than a few kilohertz, D) a base band amplifier adapted to amplify the output signal of the second set of down converter electronics to bring the output signal to a level suitable for digitizing.

17. The imaging radar system as in claim 1 and further comprising a radio system adapted for communication with the Internet.

18. The imaging radar system as in claim 4 wherein said computer processor equipment comprises:

A) a display monitor adapted to display satellite surface maps of a surface area including the two-dimensional field of view in front of the vehicle B) GPS/INU components and software for determining the latitude and longitude of positions of targets in the two-dimensional fields of view.

19. The imaging radar system as in claim 4 wherein said computer processor equipment comprises:

A) a display monitor adapted to display satellite surface maps of a surface area including the two-dimensional field of view in front of the vehicle B) GPS/INU components and software for determining the latitude and longitude of positions of FOD targets in the two-dimensional fields of view, C) Secure web database for multiple users and D) Allows global FOD data sharing.

20. The imaging radar system as in claim 1 wherein the radar system is a phased array radar system incorporating a translatable output horn.

21. The imaging radar system as in claim 1 where said frequency range of a few gigahertz is a frequency range of less than 10 GHz.

22. The imaging radar system as in claim 1 wherein said frequency range of a few gigahertz is a frequency range of about 78 to 81 GHz.

23. The imaging radar system as in claim 1 wherein the frequency scanned antenna system also comprises a cylindrical elliptical reflector.

24. The imaging radar system as in claim 1 wherein the frequency scanned antenna system also comprises a cylindrical parabolic reflector.

* * * * *